United States Patent
Yoo et al.

(10) Patent No.: US 9,846,936 B2
(45) Date of Patent: Dec. 19, 2017

(54) IMAGING APPARATUS AND CONTROLLING METHOD THEREOF THE SAME

(71) Applicant: SAMSUNG MEDISON CO., LTD., Hongcheon-gun, Gangwon-do (KR)

(72) Inventors: Jun Sang Yoo, Seongnam-si (KR); Kwang-Hee Lee, Incheon (KR); Mi Ae Byun, Seongnam-si (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 126 days.

(21) Appl. No.: 14/821,606

(22) Filed: Aug. 7, 2015

(65) Prior Publication Data

US 2016/0098832 A1    Apr. 7, 2016

(30) Foreign Application Priority Data

Oct. 7, 2014   (KR) .................. 10-2014-0134727

(51) Int. Cl.
*G06K 9/00* (2006.01)
*G06T 7/00* (2017.01)
(Continued)

(52) U.S. Cl.
CPC .............. *G06T 7/0012* (2013.01); *G06K 9/52* (2013.01); *G06K 9/6215* (2013.01); *G06T 7/20* (2013.01);
(Continued)

(58) Field of Classification Search
CPC ........... G06T 7/0012; G06T 7/20; G06T 7/60; G06T 11/001; G06T 15/005; G06T 19/00; G06T 2200/04; G06T 2207/10132; G06T 2219/008; G06K 9/52; G06K 9/6215
See application file for complete search history.

(56) References Cited

U.S. PATENT DOCUMENTS 9,280,718 B2 * 3/2016 Claude .................. A61B 5/055
2004/0257375 A1 * 12/2004 Cowperthwaite ....... G06T 15/40
345/582

(Continued)

FOREIGN PATENT DOCUMENTS

KR    10-2011-0102105 A    9/2011

OTHER PUBLICATIONS

Extended European Search Report dated Jun. 3, 2016 issued in European Patent Application No. 15156831.8.
(Continued)

*Primary Examiner* — Shefali Goradia
(74) *Attorney, Agent, or Firm* — McDermott Will & Emery LLP

(57) ABSTRACT

Disclosed herein is an imaging apparatus and a controlling method thereof, the imaging apparatus includes an image processing unit generating volume images of an object including a region of interest and extracting a reference plane of the volume images and an area setting unit automatically setting a distance from the reference plane, wherein the image processing unit may generate a 3D data of a region of interest based on a cross sectional data of the reference plane and a cross sectional data contained in a plurality of cross sectional images of the volume images existing in the distance.

21 Claims, 30 Drawing Sheets

(51) Int. Cl.
| | |
|---|---|
| G06T 7/60 | (2017.01) |
| G06K 9/52 | (2006.01) |
| G06K 9/62 | (2006.01) |
| G06T 7/20 | (2017.01) |
| G06T 11/00 | (2006.01) |
| G06T 15/00 | (2011.01) |
| G06T 19/00 | (2011.01) |

(52) U.S. Cl.
CPC .............. *G06T 7/60* (2013.01); *G06T 11/001* (2013.01); *G06T 15/005* (2013.01); *G06T 19/00* (2013.01); *G06T 2200/04* (2013.01); *G06T 2207/10132* (2013.01); *G06T 2219/008* (2013.01)

(56) References Cited

U.S. PATENT DOCUMENTS

2011/0184684 A1* 7/2011 Li ........................ A61B 90/36 702/94
2012/0022365 A1* 1/2012 Mansfield ............. A61B 6/563 600/425
2013/0230224 A1* 9/2013 Claude .................. A61B 5/055 382/131
2015/0087979 A1* 3/2015 Zhang .................. A61B 8/4494 600/440

OTHER PUBLICATIONS

M. Ruiz, et al., "Similarity-Based Exploded Views," Smart Graphics: 9th International Symposium, SG 2008, Rennes, France, Aug. 27-29, 2008, pp. 154-165.

Won, et al., "The Clinical Usefulness of vol. NTtm Using Three-Dimensional (3D) Ultrasound (US," Dept. of Obstetrics and Gynecology, University of Ulsan College of Medicine, Seoul, Korea, Article No. WP201012-VNT, Dec. 10, 2010, pp. 1-4.

W. L. Lodder, et al., "Semi-automated primary tumor volume measurements by dynamic contrast-enhanced MRI in patients with head and neck cancer," Head & Neck, vol. 35, No. 4, Apr. 2013, pp. 134-146.

* cited by examiner

CORPUS CALLUSOM : NERVE BUNDLE TO CONNECT
             THE LEFT BRAIN AND THE RIGHT BRAIN

CORPUS CALLUSOM USING BY ULTRASONIC WAVES

REFERENCE PLANE

REFERENCE PLANE

RENDERING AREA

FIG. 7A

| STORAGE UNIT ||
|---|---|
| REFERENCE DATA ||
| GESTATIONAL AGE | RENDERING AREA |
| 16 WEEKS | 5mm |
| 20 WEEKS | 17mm |
| ⋮ | ⋮ |

FIG. 8A

| STORAGE UNIT | | |
|---|---|---|
| REFERENCE DATA | | |
| GESTATIONAL AGE | HEAD CIRCUMSTANCE | RENDERING AREA |
| 16 WEEKS | 4mm | 3.5mm |
| 17 WEEKS | 5mm | 4mm |
| 20 WEEKS | 6mm | 4.5mm |
| ⋮ | ⋮ | ⋮ |

DOPPLEER INFORMATION OF CORPUS CALLOSUM

ESTIMATION OF CORPUS CALLOSUM BY PRESENCE OF DOPPLER
INFORMATION ABOUT LOCATION OF CORPUS CALLOSUM

ESTIMATION OF THICKNESS OF CORPUS CALLOSUM

NT

NT

CORPUS CALLOSUM

CORPUS CALLOSUM

Falx Line

Falx Line

IMAGING APPARATUS AND CONTROLLING METHOD THEREOF THE SAME

CROSS-REFERENCE TO RELATED APPLICATION(S)

This application claims the benefit of Korean Patent Application No. 10-2014-0134727, filed on Oct. 7, 2014 in the Korean Intellectual Property Office, the disclosure of which is incorporated herein by reference.

BACKGROUND

1. Field

Embodiments of the present disclosure relate to an imaging apparatus for generating an image and a controlling method thereof.

2. Description of Related Art

An imaging apparatus is configured to obtain information of a patient and provide an image. The imaging apparatus includes X-ray device, an ultrasound imaging apparatus, Computerized Tomography (CT) scanner, Magnetic Resonance Image (MRI), etc.

The imaging apparatus obtains three dimensional data (3D data) of a region of interest of an object by using a probe, a collimator, etc. Then the imaging apparatus generates an image including obtained 3D data and displays to a user.

Conventionally, as for obtaining 3D data (e.g., a thickness and a shape of corpus callosum) about a region of interest (e.g., corpus callosum), there is a certain process including extracting a reference plane of the region interest, manually setting a distance from the reference plane (hereinafter referred to as rendering area), obtaining a cross sectional data of a plurality of cross sectional images existing in a rendering area, and generating a 3D data based on the obtained data of the plurality of cross sectional images. Therefore, to generate 3D data, a user may confirm a data of the plurality of cross sectional images one by one and may set a rendering area manually.

SUMMARY

Therefore, it is an aspect of the present disclosure to provide an imaging apparatus configured to generate images including a 3D data of a region of interest and configured to automatically set a distance from a reference plane of a region of interest or a rendering area, and a control method of the imaging apparatus.

It is another aspect of the present disclosure to provide an imaging apparatus configured to set a distance from a reference plane of a region of interest, and configured to generate a 3D data based on data of a plurality of cross-sectional images existing in a predetermined distance or a rendering area, and a control method of the imaging apparatus.

Additional aspects of the present disclosure will be set forth in part in the description which follows and, in part, will be obvious from the description, or may be learned by practice of the invention.

In accordance with one aspect of the present disclosure, an imaging apparatus includes an image processing unit generating volume images of an object including a region of interest and extracting a reference plane of the volume images and an area setting unit automatically setting a distance from the reference plane, wherein the image processing unit may generate a 3D data of the region of interest based on a cross sectional data of the reference plane and a cross sectional data contained in a plurality of cross sectional images of the volume images existing in the distance.

The reference plane may include at least one of a median plane, a mid-sagittal plane, a coronal plane or a horizontal plane.

The distance may include a thickness of the region of interest.

The imaging apparatus may further include a storage unit storing distances corresponding to one or more first reference data and an input unit receiving a first reference data from a user, wherein the area setting unit may set a distance corresponding to the first reference data inputted through the input unit as a distance from the reference plane.

The imaging apparatus may further include a storage unit storing a distance corresponding to a first reference data and a second reference data, wherein the area setting unit may determine a second reference data corresponding to a first reference data contained in the plurality of cross sectional images, and may set a distance corresponding to the second data as a distance from the reference plane.

The area setting unit may calculate a similarity between a cross sectional data of a region of interest contained in the reference plane and across sectional data of a region of interest contained in the plurality of cross sectional images, and may set a distance from the reference plane to a plurality of cross sectional images having a similarity greater than a reference value as a distance from the reference plane.

The area setting unit may obtain Doppler information of a region of interest contained in the plurality of cross sectional images, and may set a distance from the reference plane to a plurality of cross sectional images indicating blood flow speed, which is contained in Doppler information, greater than a reference value as a distance from the reference plane.

The area setting unit may obtain Doppler information of a region of interest contained in the plurality of cross sectional images, and may set a distance from the reference plane to a plurality of cross sectional images having color information of a region of interest, which is contained in Doppler information, as a distance from the reference plane.

The image processing unit may extract cross sectional images including the region of interest as a reference plane.

The 3D data may include a rendering image.

The imaging apparatus may further include a display unit displaying the 3D data.

The display unit may display at least one of a marker indicating the region of interest or diagnostic information of the region of interest.

The marker may include at least one of a color indicating the region of interest or an arrow.

The diagnostic information may include at least one of a standard view of the region of interest, biparietal diameter (BPD), occipitofrontal diameter (OFD), head circumference (HC), Posterior Cerebral Ventricle Diameter (Vp), abdominal circumference (AC), femur length (FL), a location of thalamus (T), Doppler information of vessel, Transverse cerebellar Diameter (TCD), or Cisterna Magna (CM).

The display unit may display a 3D data of a predetermined area in the region of interest.

The display unit may display a rendering image having improved contrast based on the 3D data.

The imaging apparatus may include an ultrasonic imaging apparatus.

The image processing unit may extract a reference plane of volume images based on at least one of a feature point and a feature surface of the region of interest.

The region of interest may include at least one of corpus callosum (CC), Nuchal Translucency (NT), or Falx.

The distance may include a vertical distance from the reference plane.

The imaging apparatus may further include an input unit receiving information about at least one of the object or the region of interest.

In accordance with one aspect of the present disclosure, a control method of an imaging apparatus includes generating a volume image of a region of interest, extracting a reference plane of the volume image, setting automatically a distance from the reference plane, and generating a 3D data of the region of interest based on cross sectional data of the reference plane and a cross sectional data contained in a plurality of cross sectional images of the volume image existing in a distance.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 7A-8B are views illustrating a method of setting a distance by using a reference data;

DETAILED DESCRIPTION

The present disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the description of the present disclosure, if it is determined that a detailed description of commonly-used technologies or structures related to the embodiments of the present disclosure may unnecessarily obscure the subject matter of the invention, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Embodiments of the present disclosure will now be described with reference to accompanying drawings.

Figure 1:
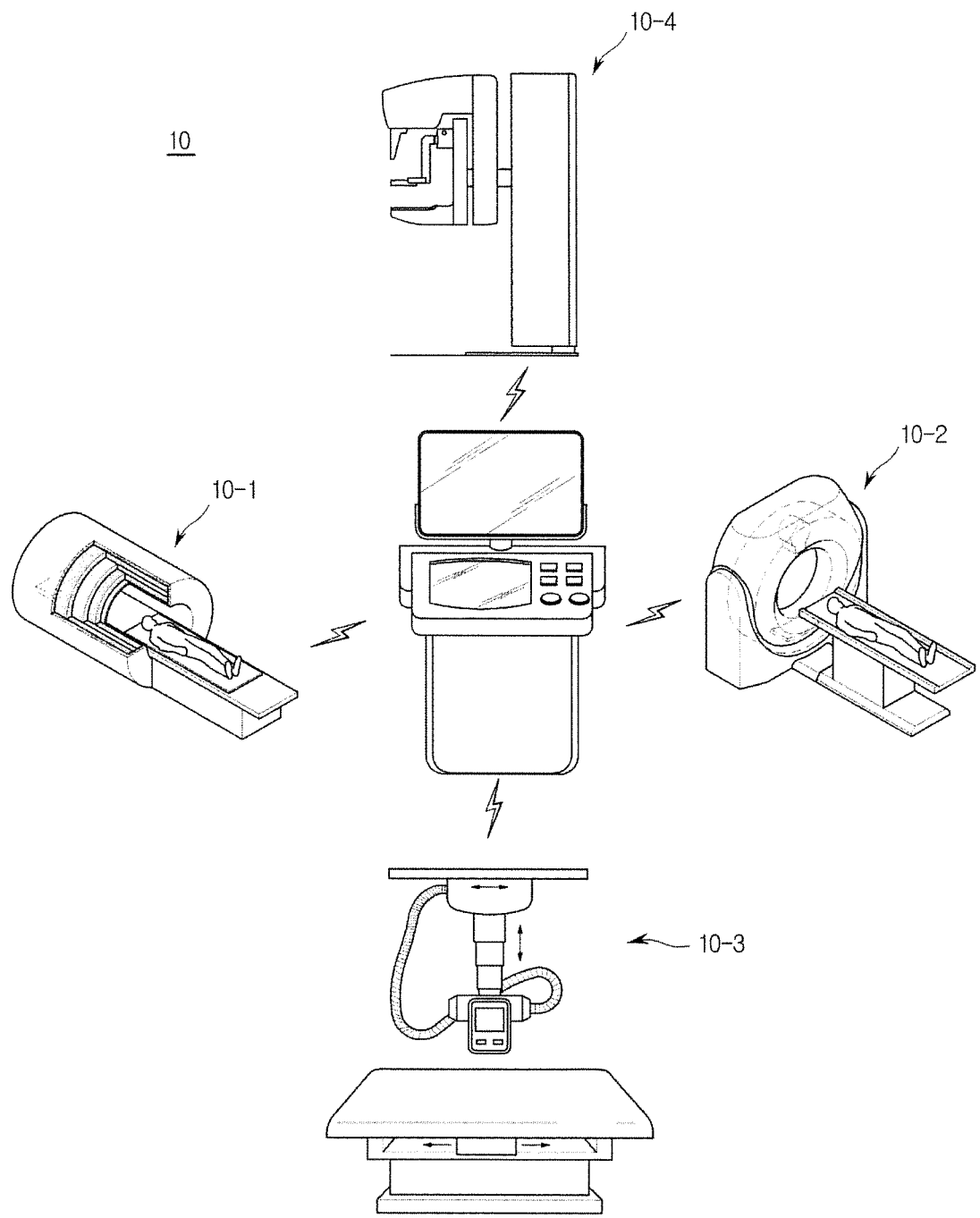
FIG. 1 is a schematic view illustrating an imaging apparatus according to an embodiment of the present disclosure.

FIG. 1 is a view schematically illustrating an imaging apparatus according to an embodiment of the present disclosure.

As illustrated in FIG. 1, an imaging apparatus 10 may include image recording units 10-1, 10-2, 10-3, 10-4 configured to record internal images or external images of an object, and a host device 100 configured match images received from the image recording units 10-1, 10-2, 10-3, 10-4.

As illustrated in FIG. 1, the image recording units 10-1, 10-2, 10-3, 10-4 may be spaced apart from the host device 100 with a certain distance. The image recording units 10-1, 10-2, 10-3, 10-4 and the host device 100 may be connected through various wired/wireless communication protocols.

For example, the image recording units 10-1, 10-2, 10-3, 10-4 may be communicated with the host device 100 according to Digital Imaging and Communications in Medicine (DICOM), but is not limited thereto. The image recording units 10-1, 10-2, 10-3, 10-4 and the host device 100 may be connected by mobile communication protocol, such as global System for Mobile Communication (GSM), Code Division Multiple Access (CDMA), Wideband Code Division Multiple Access (WCDMA), Time Division Multiple Access (TDMA), Long Term Evolution (LTE), etc., and local area communication protocol, such as Wireless Local Access Network (WLAN), Bluetooth, Zigbee, NFC, etc.

The image recording units 10-1, 10-2, 10-3, 10-4 may be configured to obtain internal images of the object by using radiation, magnetic resonance, and ultrasonic waves. For example, the image recording units 10-1, 10-2, 10-3, 10-4 may obtain internal images of the object by using radiation, such as Computed Tomography (CT) apparatus, Positron Emission Tomography (PET) apparatus, single photon emission computed tomography (SPECT) apparatus, Mammography apparatus, etc. In addition the image recording units 10-1, 10-2, 10-3, 10-4 may obtain internal images of the object by using magnetic resonance, such as Magnetic Resonance Imaging apparatus, and may obtain internal images of the object by using ultrasonic waves.

As mentioned above, the image recording units 10-1, 10-2, 10-3, 10-4 may obtain images of the object in various ways and each image obtaining method may have advantages and disadvantages. For example, computed tomography (CT) has a relatively short scan time and a rather low cost, but a magnetic resonance imaging method has a relatively long scan time and expensive cost. However, the magnetic resonance imaging method provides images having a high definition.

A preference of each image obtaining methods may be different depending on an internal structure and features of an object. For example, when the object is human, a recommended image obtaining method for the diagnosis of diseases of the organs may be various depending on characteristics and structures of organ structure. Therefore, the diagnosis of disease may be easily performed by obtaining images through an image obtaining method proper for each organ and by matching the images obtained through a proper method. In addition, time and cost for obtaining images may be reduced because images may be obtained by a proper image obtaining method.

Hereinafter, for the convenience of explanation, generating images by using an ultrasonic image obtaining method will be described, but is not limited thereto. Alternatively, an image obtaining method may be replaced or changed to another method to obtain different internal images. In addition, various image obtaining methods may be applied to generate images.

Figure 2:
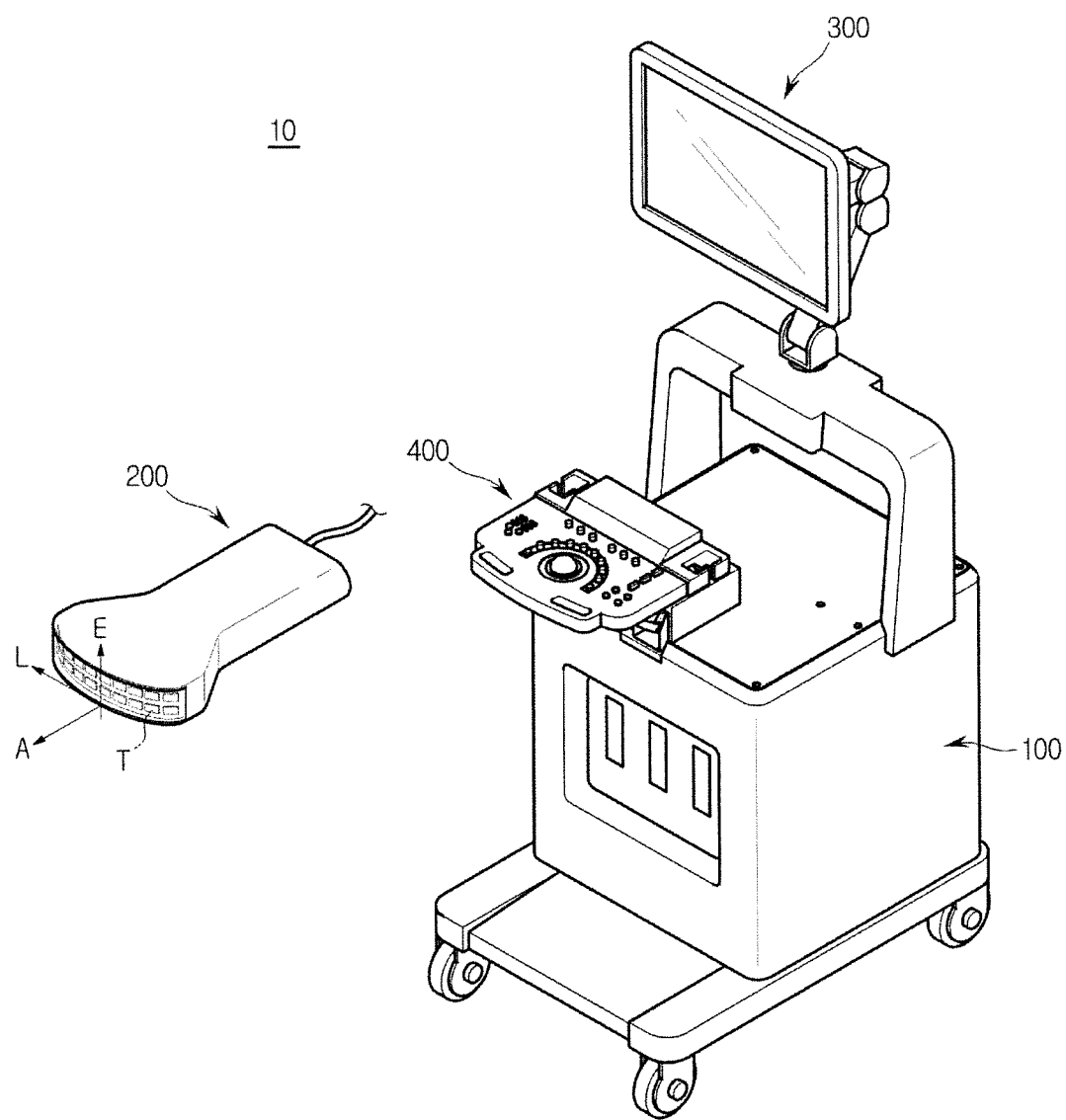
FIG. 2 is a perspective view illustrating the imaging apparatus according to an embodiment of the present disclosure.
Figure 3:
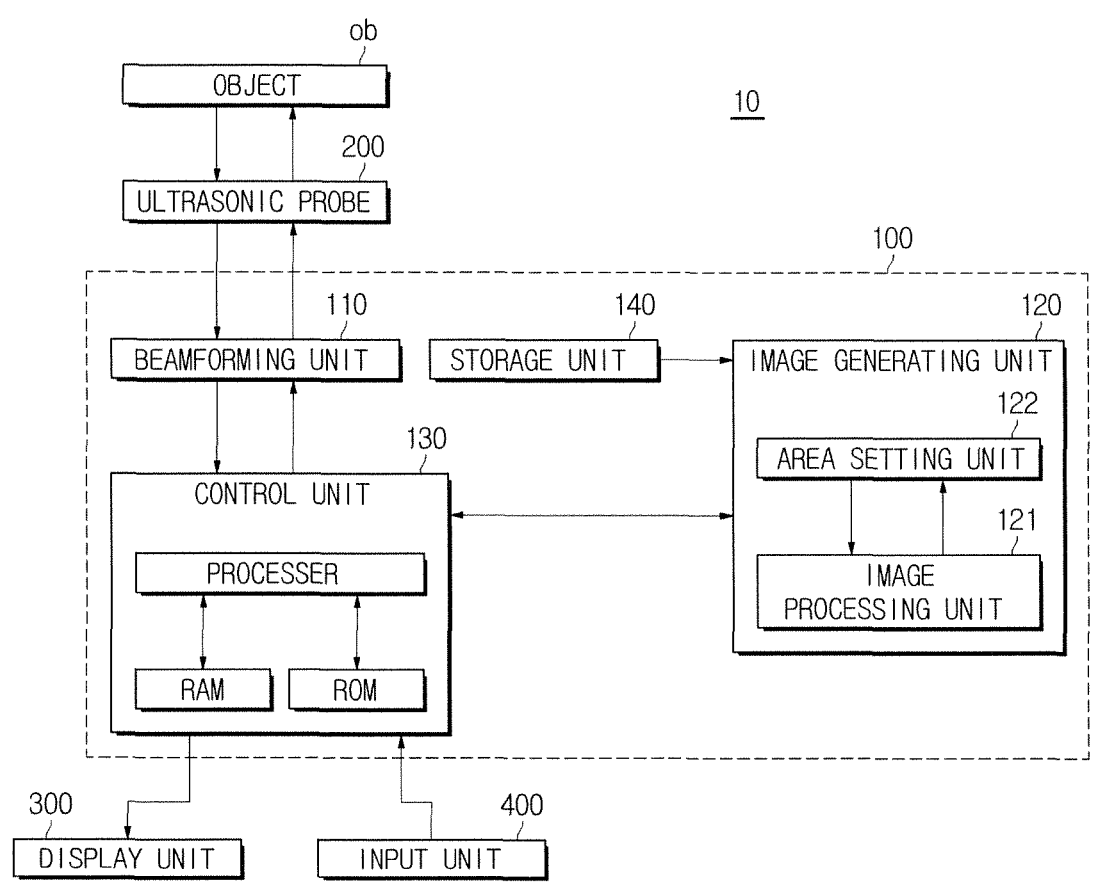
FIG. 3 is a block diagram illustrating the imaging apparatus according to an embodiment of the present disclosure.

FIG. 2 is a perspective view illustrating the imaging apparatus according to an embodiment of the present disclosure and FIG. 3 is a block diagram illustrating the imaging apparatus according to an embodiment of the present disclosure.

Referring to FIG. 2, an imaging apparatus 10 may include a host device 100, an ultrasonic probe 200, a display unit 300, and an input unit 400.

The ultrasonic probe 200 may include at least one transducer to transmit ultrasonic signals to an object and receive echo ultrasounds reflected from the object. The ultrasonic probe 200 may convert an electrical signal into ultrasonic waves and vice versa.

Particularly, when the ultrasound probe 200 is supplied with power from an external power supply or an internal electricity storage device, e.g., battery, the transducers generate ultrasounds while vibrating due to the applied current and irradiate the ultrasounds to an external object. Each transducer receives an echo ultrasound reflected and returned from the object, and generates a current while vibrating due to the echo ultrasound, the current having a frequency corresponding to the vibration frequency.

The transducer may be a Magnetostrictive Ultrasound Transducer (MUT) that uses magnetostrictive effects of a magnetic substance, a Capacitive Micromachined Ultrasonic Transducer (cMUT) that uses vibration of hundreds or thousands of microfabricated thin films, or a Piezoelectric Ultrasonic Transducer (PUT) that uses piezoelectric effects of a piezoelectric substance.

The transducers may be linear array, convex array, phased array, sector array transducers, etc., which may be arranged in a form of a row or a matrix. When the transducers are arranged in a row, they may be swung in the elevation direction to obtain a plurality of ultrasonic images: and when they are arranged in a form of a matrix, a plurality of ultrasonic images may be obtained by a single transmission of ultrasounds.

However, the transducers are not limited thereto, but may be implemented with any other types of transducers known to skilled people in the art. The ultrasonic probe 200 of the imaging apparatus 10 may be the image recording units 10-1, 10-2, 10-3, 10-4 as illustrated in FIG. 1.

An end of a cable may be connected to the ultrasound probe 200 and the other end of the cable may be connected to a male connector (not shown). The male connector connected to the other end of the cable may be physically coupled with a female connector (not shown) of the host device 100.

The host device 100 may store main components of the imaging apparatus, such as a beamforming unit 110. When a user input an ultrasound diagnosis command, the beamforming unit 110 may generate a transmit signal and transmit the transmit signal to the ultrasonic probe 200.

The host device 100 may include at least one female connectors (not shown), which are physically coupling to male connectors (not shown) connected to cables so that the host device 100 and the ultrasound probe 200 may communicate signals. For example, a transmit signal generated by the host device 100 may be sent to the ultrasound probe 200 through the male connector connected to the female connector of the host device 100 and the cable.

In addition, a plurality of casters configured to fix or move the host device 100 to a certain place may be mounted on a lower portion of the host device 100.

Hereinafter each component stored or included in the host device 100 will be described with reference to FIG. 3. Referring to FIG. 3, the host device 100 according to an embodiment of the present disclosure may include the beamforming unit 110, an image generating unit 120, a control unit 130, and a storage unit 140.

The beamforming unit 110 may include a transmit beamformer and a receive beamformer to perform transformation between analog signals and digital signals and to adjust time differences of ultrasounds, which is transmitted by at least one transducer or received from the at least one transducers, by controlling the transducer.

Ultrasounds adjusted time differences may be focused as a receive signal, and the focused receive signal may be supplied to the image generating unit 120. As mentioned above, the signal supplied to the image generating unit 120 may be defined as an input signal.

The image generating unit 120 may generate an ultrasonic image corresponding to an input signal received through the beamforming unit 110. The generated ultrasonic image may be an Amplitude mode (A-mode), a Brightness mode (B-mode), a Doppler mode (D-mode), an Elastography mode (E-mode), and a Motion mode (M-mode), but is not limited thereto. Hereinafter, an image in Brightness mode (B-mode) will be described as an example. The B-mode may be a diagnosis mode in which a size of echo ultrasounds reflected from the object is converted to brightness and displayed. According to embodiments, a diagnostic imaging may be displayed on the display unit 300 in various modes. In addition, the ultrasound imaging may be generated in two or three dimensional image.

The object may be a living body of a human or animal, an organ in the living body, such as blood vessels, bones, muscles, etc., but is not limited thereto. Therefore, anything whose internal structure may be imaged by the imaging apparatus 10 may be the object.

Particularly, the image generating unit 120 may generate two dimensional cross sectional images (hereinafter referred to as cross-sectional images) and three dimensional volume images (hereinafter referred to as volume images) based on an input signal focused by the receive beamformer. In addition, the image generating unit 120 may generate measurement or diagnostic information (hereinafter referred to as a cross-sectional data) contained in the cross-sectional images and measurement or diagnostic information (hereinafter referred to as a 3D data) contained in the volume images. The image generating unit 120 may include an image processing unit 121 generating a volume image, a cross-sectional image, a cross-sectional data, and a 3D data and an area setting unit 122 automatically setting a distance from a reference plane.

A region of interest may be an area of interest in an object which is subject to generate a 3D data. For example, when an object is brain of fetus, a region of interest may be a particular part of the object, such as corpus callosum (CC) which is nerve bundle to connect the left brain and the right brain of the fetus, Nuchal Translucency (NT), Falx, Cavum septum pellucidum (CSP), etc. The region of interest may be set in advance according to user's input.

When an object is a brain, across sectional image may be images about a mid-sagittal plane, a trans-thalamic plane, and a trans-cerebellar plane, and when an object is a cardiology, across sectional image may be images about Four-chamber view, Five chamber view, three vessel view (3VT), Right ventricular outflow tract (RVOT). Left ventricular outflow tract, (LVOT), Bicaval View, Aortic Arch, Ductal Arch, Short Axis View, Long Axis view and Trans-ventricular plane. In addition, the cross-sectional image may be an image which is seen from the view and may include all cross sectional images of the object.

A reference plane of these cross sectional images may represent a reference for generating a 3D data by the image processing unit 121

Figure 4A:
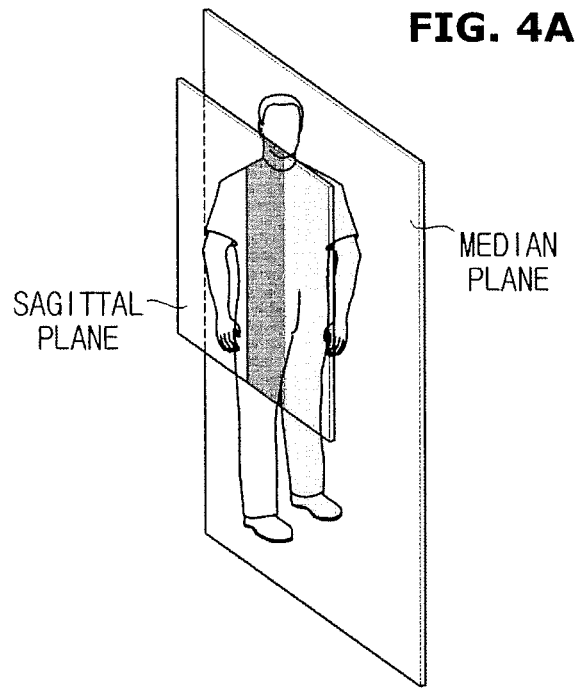
FIGS. 4A-4C are examples of a reference plane.
Figure 4B:
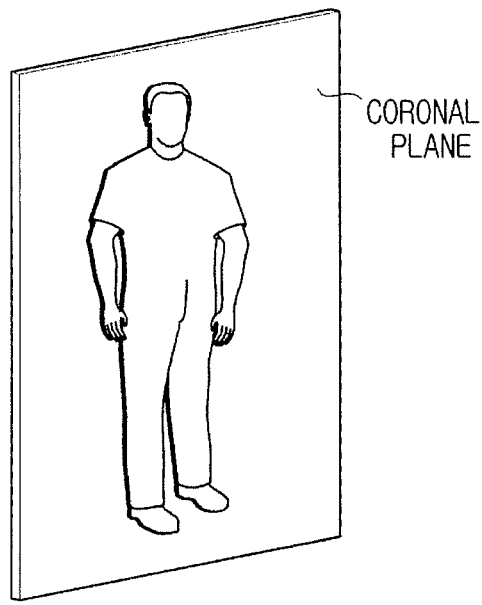
Figure 4C:
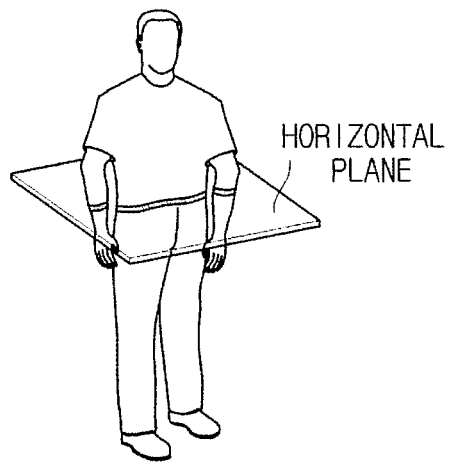

FIGS. 4A-4C are examples of a reference plane.

Referring to FIGS. 4A-4C, a reference plane may be any one of a median plane, a mid-sagittal plane, a coronal plane (frontal plane) and a transverse plane (horizontal plane).

In FIG. 4A, a sagittal plane or a median plane may represent a virtual plane dividing an object or a region of interest into right and left, and a mid-sagittal plane may represent a sagittal plane passing through a center of an object or a region of interest.

In FIG. 4B, a coronal plane (frontal plane) may represent a virtual plane dividing an object or a region of interest into front and back.

In FIG. 4C, a transverse plane (horizontal plane) may represent a virtual plane dividing an object and a region of interest into up and down.

For example, When an object is a brain, a reference plane may be a mid-sagittal plane, a trans-thalamic plane, and a trans-cerebellar plane, and when on object is a cardiology, a reference plane may be Four-chamber view, Five chamber view, three vessel view (3VT), Right ventricular outflow tract (RVOT), Left ventricular outflow tract, (LVOT), Bicaval View, Aortic Arch, Ductal Arch, Short Axis View, Long Axis view and Trans-ventricular plane. But the reference plane is not limited thereto, and a referent plane may include a cross-sectional image contained in all volume images which are set automatically or manually. Hereinafter, a mid-sagittal plane may be described as a reference plane.

Volume images are an image representing an object in 3D image. When the imaging apparatus 10 records the object by using X-rays, volume images may represent an image generated through obtaining a volume data of a region of interest by rotating the X-rays in a spiral around the object. When the imaging apparatus 10 records the object by ultrasonic waves, volume images may represent an image generated through obtaining a volume data of a region of interest using by a 3D ultrasonic probe, a matrix ultrasonic probe, a mechanical ultrasonic probe or the like.

A cross-sectional data may include various measurements or diagnostic information which may be obtained from cross-sectional images of an object or a region of interest, such as brightness, a blood flow speed, a type, a shape, and a size. Measurement or diagnostic information contained in the cross-sectional data may include a standard view of an object and region of interest, biparietal diameter (BPD), occipitofrontal diameter (OFD), head circumference (HC) of fetus, Posterior Cerebral Ventricle Diameter (Vp), abdominal circumference (AC), femur length (FL), femur length (FL), a location of thalamus (T), Doppler information of vessels. Transverse cerebellar Diameter (TCD), a location of Cisterna Magna (CM), etc.

A 3D data may include various measurement or diagnostic information, such as rendering images, a thickness, or a depth information, which may be obtained from a plurality of cross sectional data of volume images of an object or a region of interest. The rendering images may represent 3D images generated by adding a reality to 2D images by using a shadow, a color, a contrast, etc.

Figure 5A:
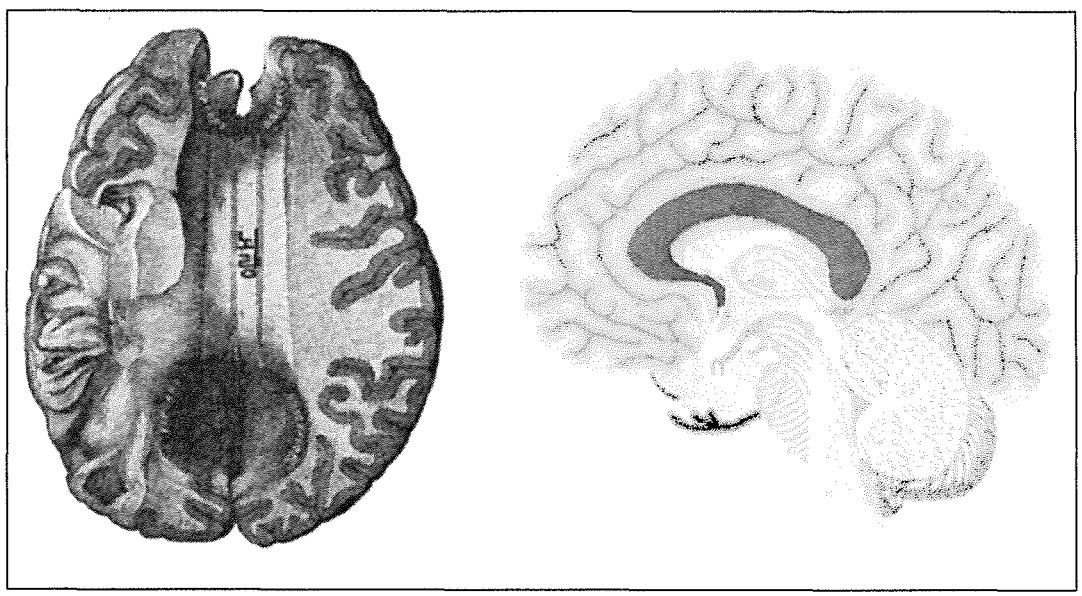
FIG. 5A is a cross-sectional image of an object including a mid-sagittal plane and a trans-thalamic plane of corpus callosum.
Figure 5B:
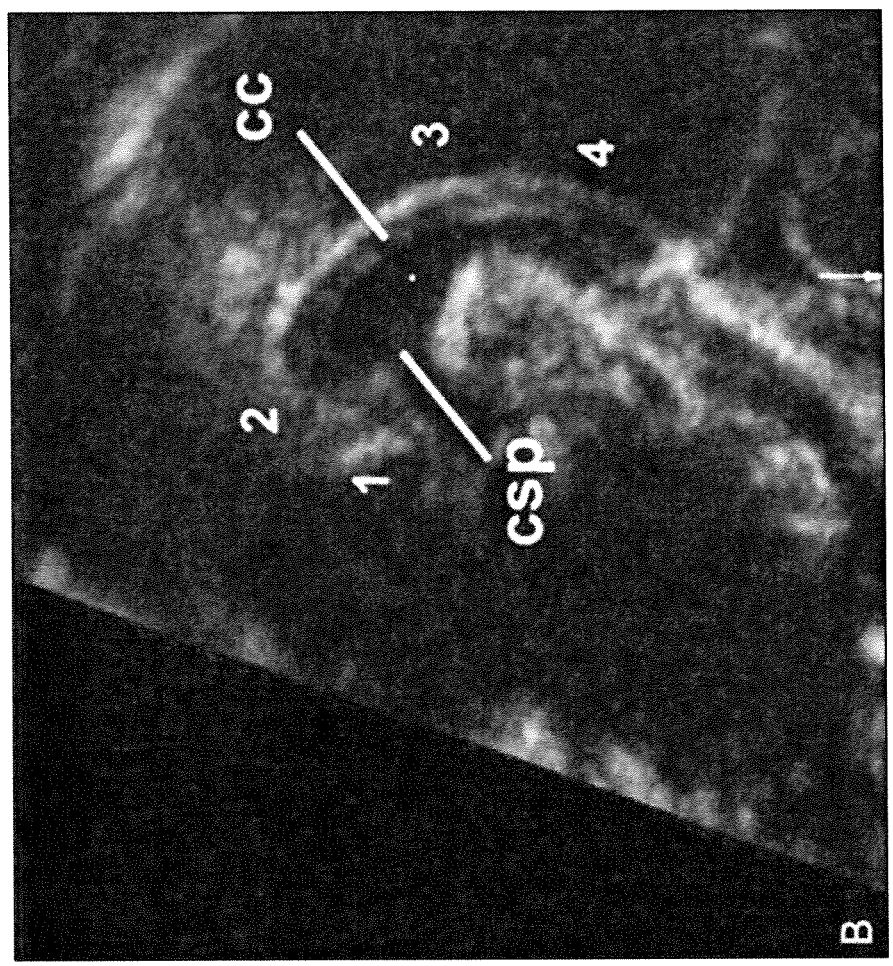
FIG. 5B is a cross-sectional image of an object including cavum septum pellucidum placed between corpus callosum and cerebaral ventricle.

For convenience of description, corpus callosum (CC) will be described as an example. FIG. 5A is a cross-sectional image of an object including a mid-sagittal plane and a trans-thalamic plane of corpus callosum and FIG. 5B is a cross-sectional image of an object including cavum septum pellucidum placed between corpus callosum and cerebaral ventricle.

The image processing unit 121 may generate cross-sectional images and volume images (not shown) of an object including corpus callosum (CC), and may generate a cross-sectional data and a 3D data. In addition, the image processing unit 121 may generate and process various images and data which are displayed to a user through the display unit 300.

The area setting unit 122 may automatically set a distance from a reference plane extracted by the image processing unit 121 to generate a 3D data.

For example, the distance from the reference plane may be a rendering area.

The rendering area may include a vertical distance in a positive (+) direction from the reference plane, and a vertical distance in a negative (−) direction from the reference plane. The image processing unit 121 may generate a 3D data of a region of interest based on a cross sectional data included in a plurality of cross sectional images existing in the rendering area. A method of automatically setting a distance from a reference plane by the area setting unit 122 will be described later.

Generating 3D data may include generating 3D image by adding reality to 2D image by using a shadow, a color, a contrast, and expressing a 3D data, such as a depth, a thickness, etc. in a 2D image.

Hereinafter a 3D data generation processing of the image processing unit 121 and the area setting unit 122 will be described with reference to FIGS. 6A-6D. FIGS. 6A-6D are views illustrating a 3D data generation processing of an image generating unit.

Figure 6A:
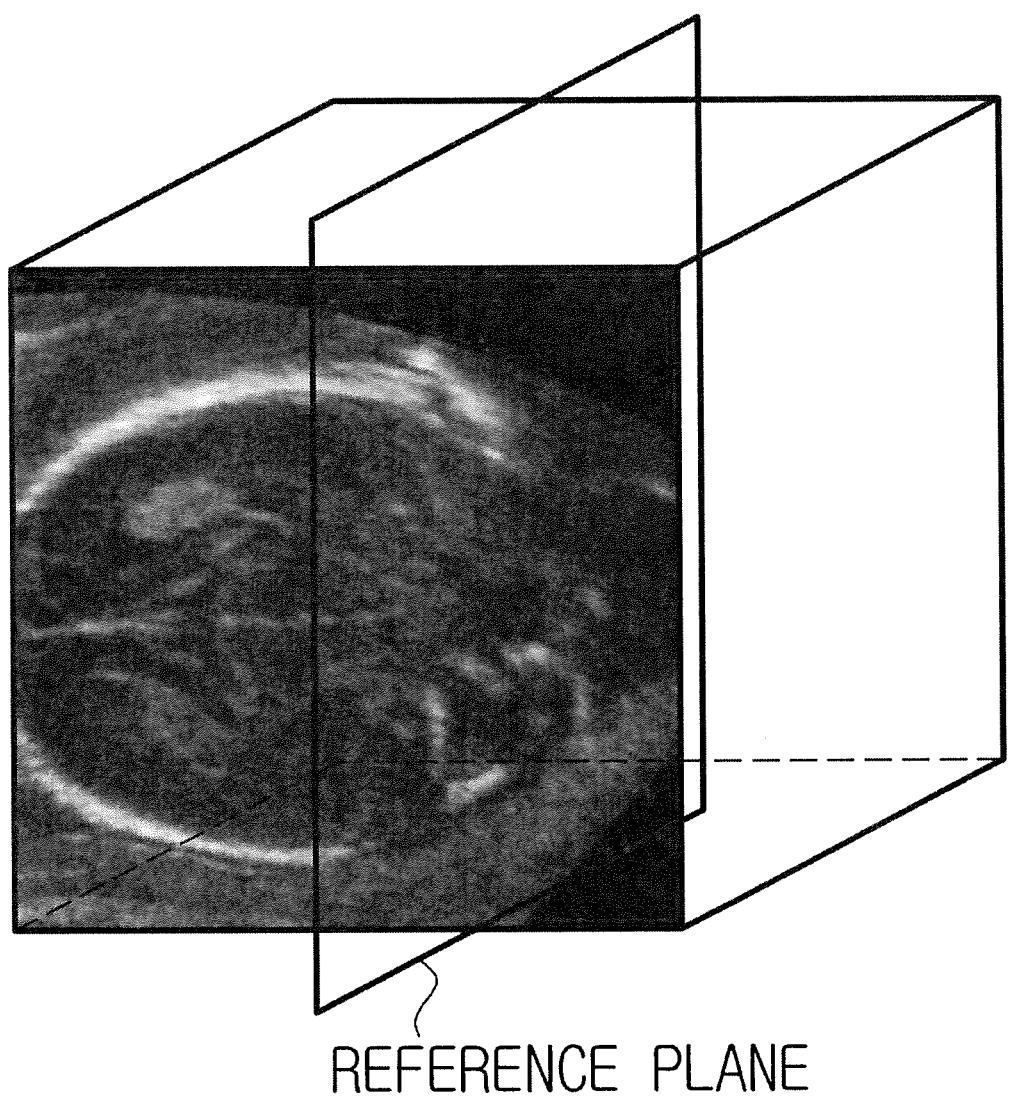
FIGS. 6A-6D are views illustrating a 3D data generation processing of an image generating unit.

Referring to FIG. 6A, the image processing unit 121 may generate a volume image of an object including a region of interest and may extract a reference plane of the volume image. For example, the image processing unit 121 may generate the volume image of the brain of fetus and may extract a mid-sagittal plane of the brain as a reference plane.

Figure 6B:

Referring to FIG. 6B, the image processing unit 121 may automatically extract a reference plane or may manually extract a reference plane according to a data inputted through the input unit 400.

Particularly, when automatically extracting a reference plane, the image processing unit 121 may extract by using anatomical information including a feature point and a feature line of an object. The anatomical information may include mid-line of brain information, such as 3rd ventricle line, and Falx line. In addition, the image processing unit 121 may extract mid-sagittal plane by using a machine learning method based on data stored in the storage unit 140.

When automatically extracting a reference plane, the image processing unit 121 may determine to set the brightest cross sectional image as a reference plane based on brightness values of a plurality of cross sectional images, which is perpendicular to a trans-ventricular plane included in volume images. In addition, the image processing unit 121 may determine to set any one cross sectional image among a plurality of substitute cross sectional images, which is horizontal in a mid-sagittal plane and perpendicular to a trans-ventricular plane, as a reference plane based on gradient magnitude of a plurality of cross sectional images, which is perpendicular to a trans-ventricular plane included in volume images. The image processing unit 121 may determine to set any one cross sectional image among a plurality of substitute cross sectional images in which a trans-ventricular plane is rotated.

When manually extracting a reference plane, the image processing unit 121 may detect falx from a volume data by using a feature point or a feature line inputted ED through the input unit 400, and may extract a mid-sagittal plane as a reference plane by using detected falx. The falx may represent a dura mater separating the cerebellar hemispheres.

Figure 6C:
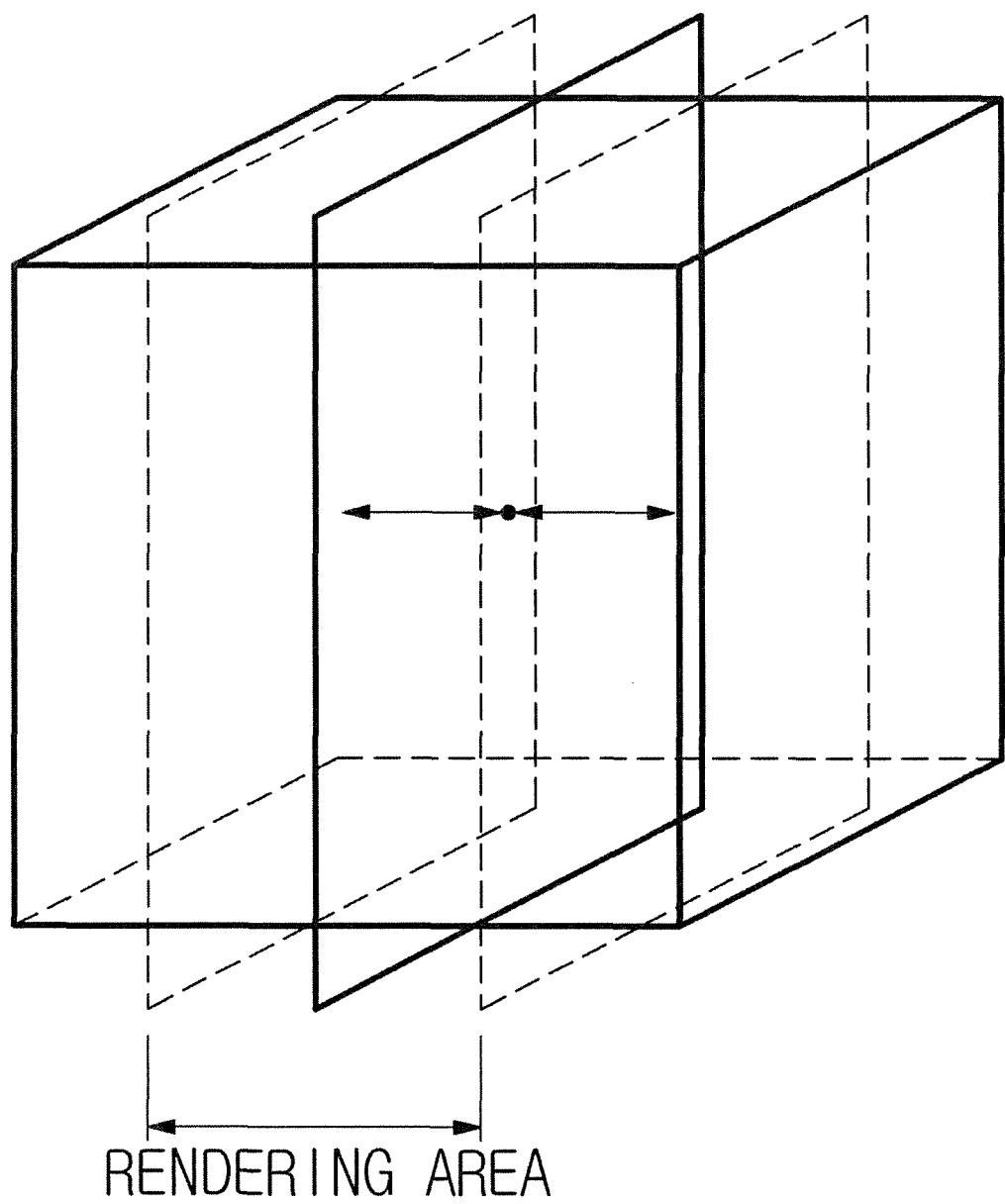

Referring to FIG. 6C, the area setting unit 122 may automatically set a distance from a reference plane. For example, the distance from the reference plane may represent a rendering area to generate rendering images of corpus callosum (CC), and a vertical distance from the reference plane. A method of automatically setting a distance from a reference plane by the area setting unit 122 will be described later with reference to FIGS. 6A-9B.

Figure 6D:
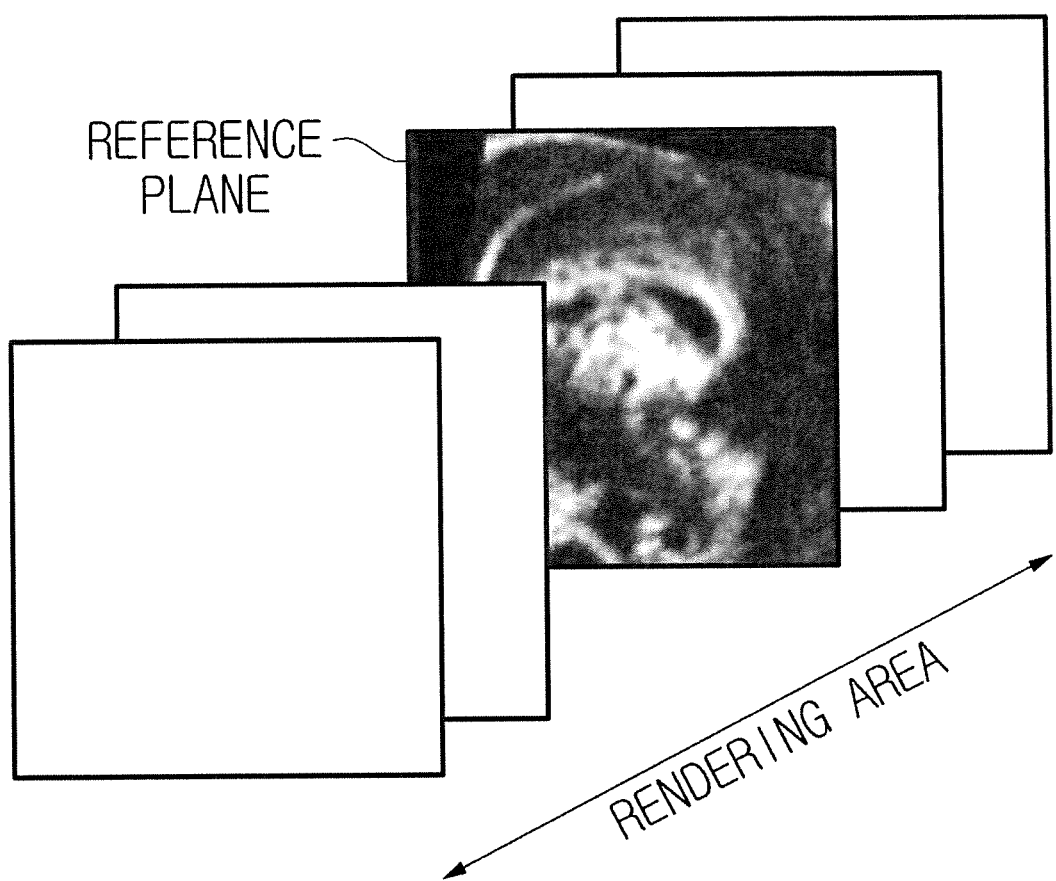

Referring to FIG. 6D, the image processing unit 121 may generate a 3D data of a region of interest based on a cross sectional data including a plurality of cross sectional images (including a reference plane) of volume images existing within a certain distance from a set reference plane.

Figure 9A:
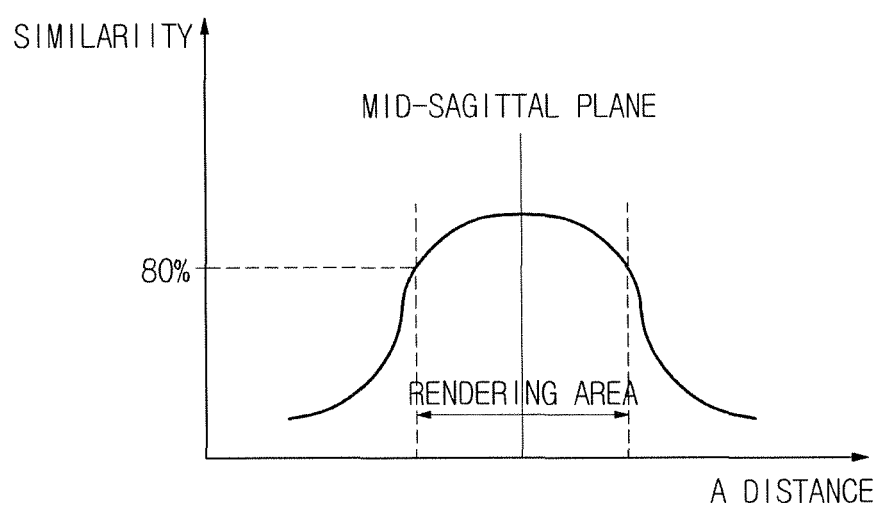
FIGS. 9A and 9B are views illustrating a method of setting a distance by using a similarity with a reference plane.
Figure 9B:
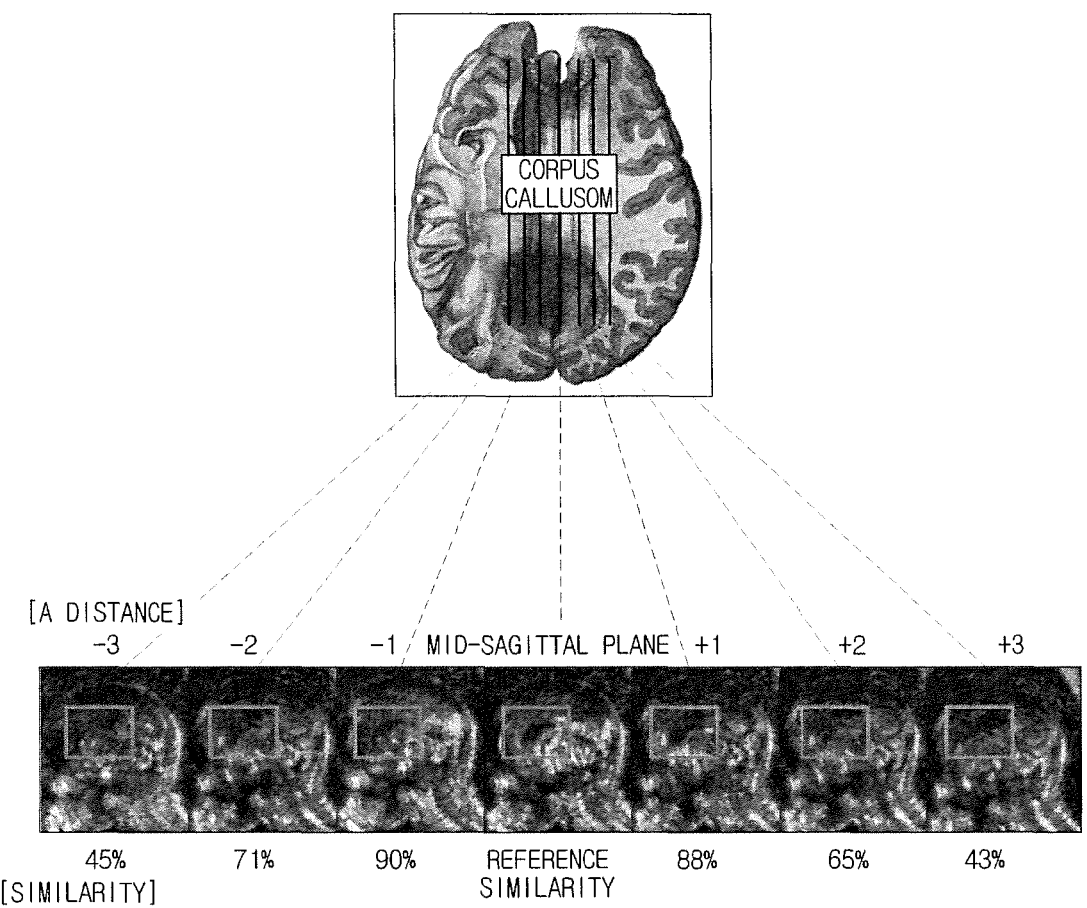
Figure 10A:
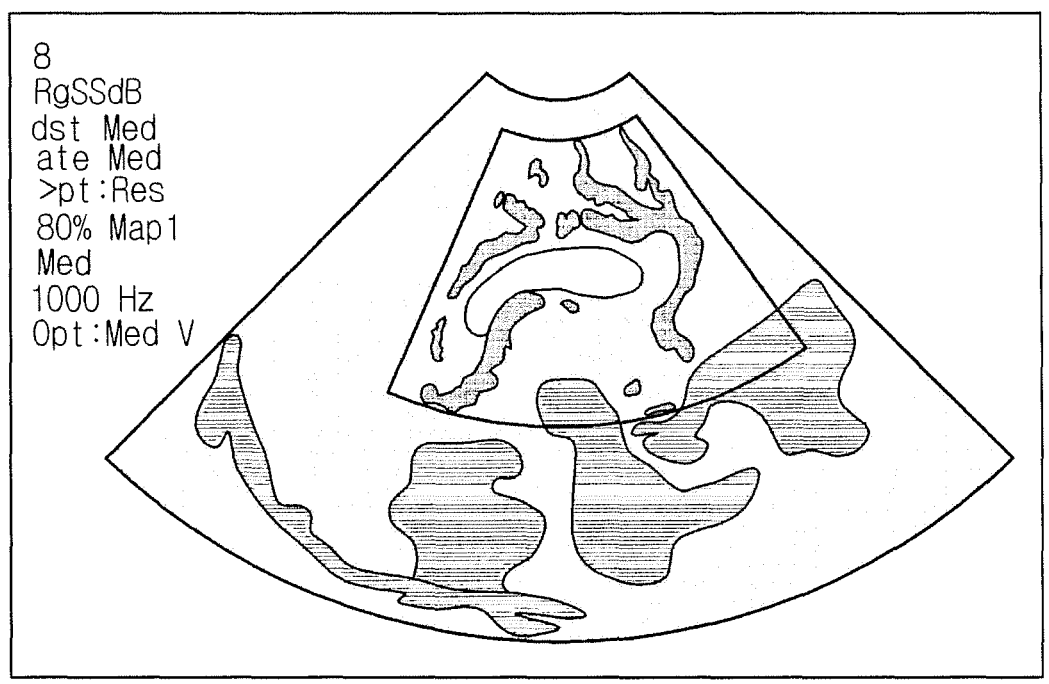
FIGS. 10A-10C are views illustrating a method of setting a distance by using Doppler information of a plurality of cross-sectional images.
Figure 10B:
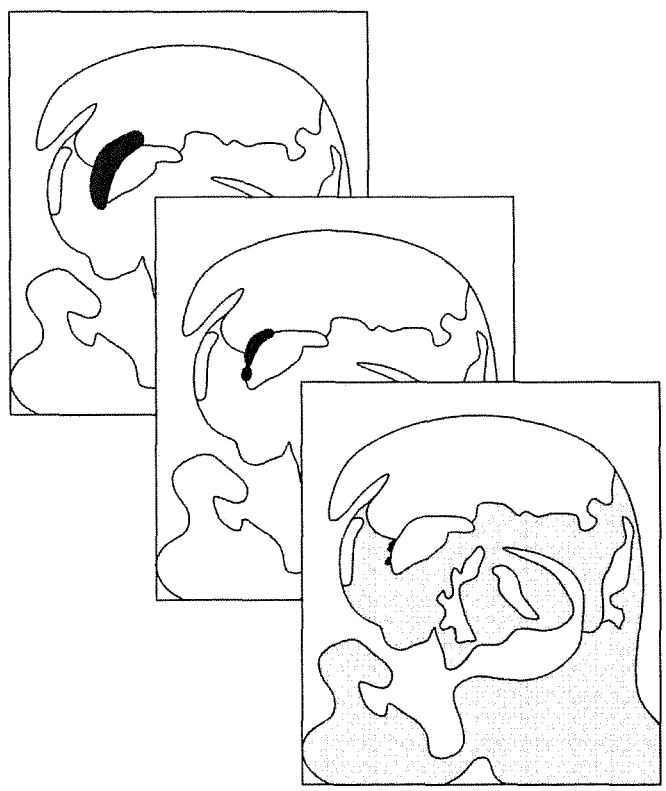
Figure 10C:
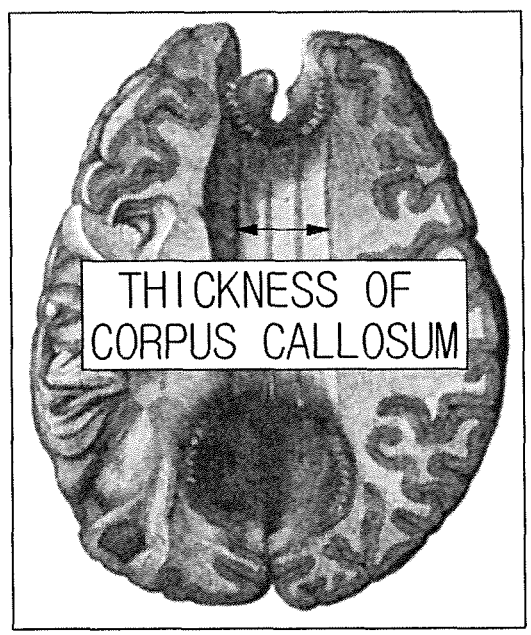

Hereinafter a method of automatically setting a distance from a reference plane by the area setting unit 122 during a process of FIG. 6C will be described in detail with reference to FIGS. 7A-10C. FIGS. 7A-8B are views illustrating a method of setting a distance by using a reference data, FIGS. 9A and 9B illustrating a method of setting a distance by using a similarity with a reference plane, and FIGS. 10A-10C are views illustrating a method of setting a distance by using Doppler information of a plurality of cross-sectional images.

Figure 7B:
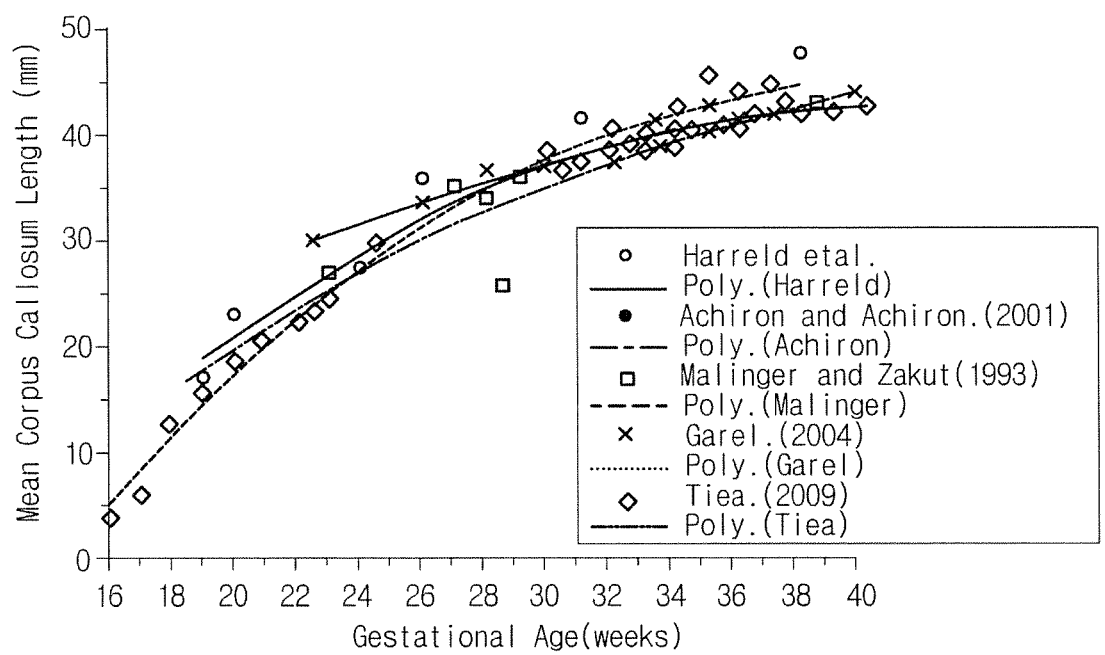
Figure 7C:
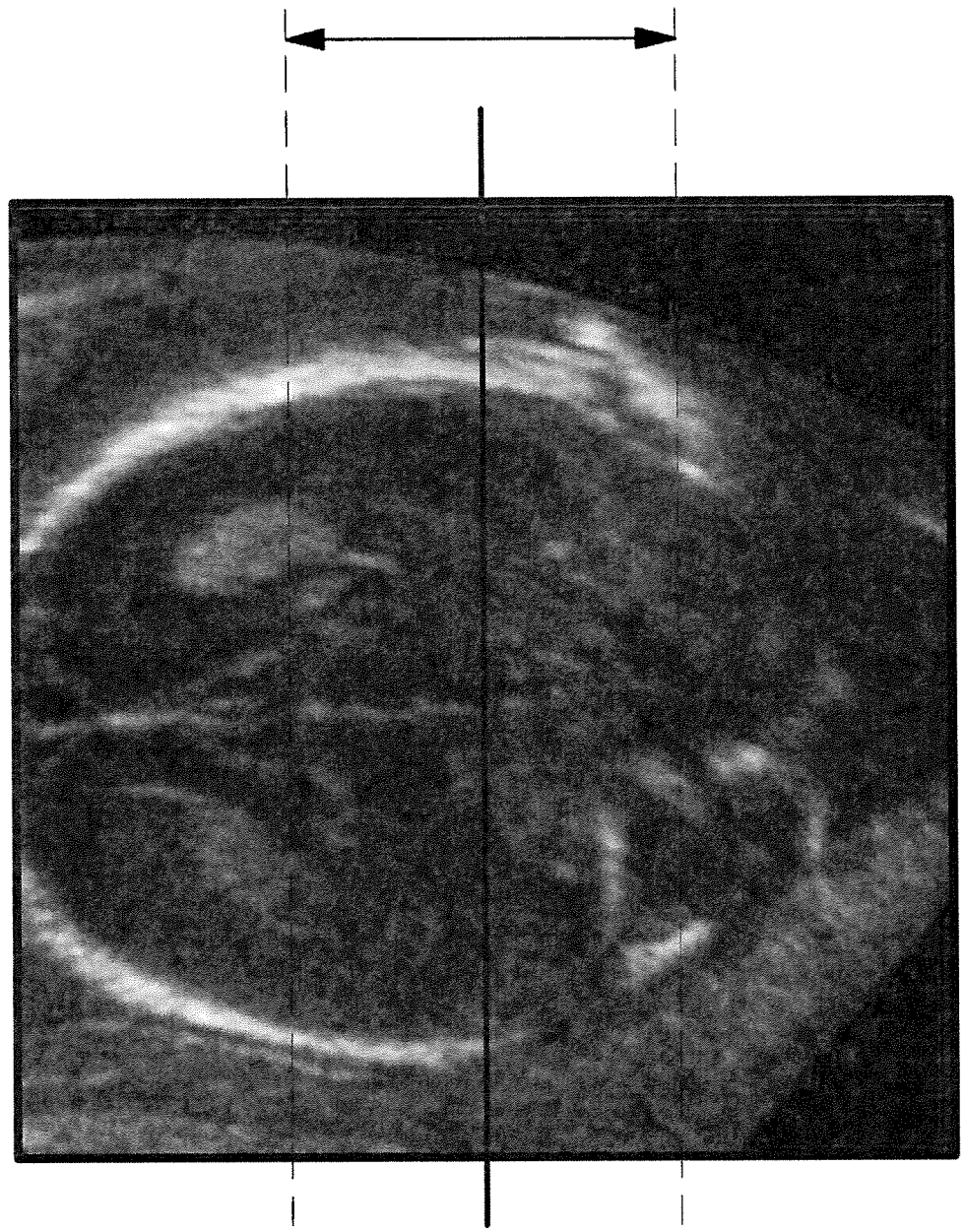

Referring to FIGS. 7A-8B, the area setting unit 122 according to an embodiment of the present disclosure, may set a distance (hereinafter referred to as a rendering area) by using a reference data stored in the storage unit 140. Particularly, when the storage unit 140 stores a rendering area corresponding to a first reference data in a table shape, as illustrated in FIG. 7A, or in a graph of function, as illustrated in FIG. 7B, the area setting unit 122 may extract a rendering area corresponding to the first reference data from the storage unit 140, wherein the first reference data may be inputted from a user through the input unit 400 or automatically determined. As illustrated in FIG. 7C, the area setting unit 122 may set the rendering area extracted from the storage unit 140 as a rendering area of a region of interest. For example, the first reference data may be gestational age (GA) or corpus callosum length. The gestational age may be a parameter representing that how many weeks is fetus.

Figure 8B:
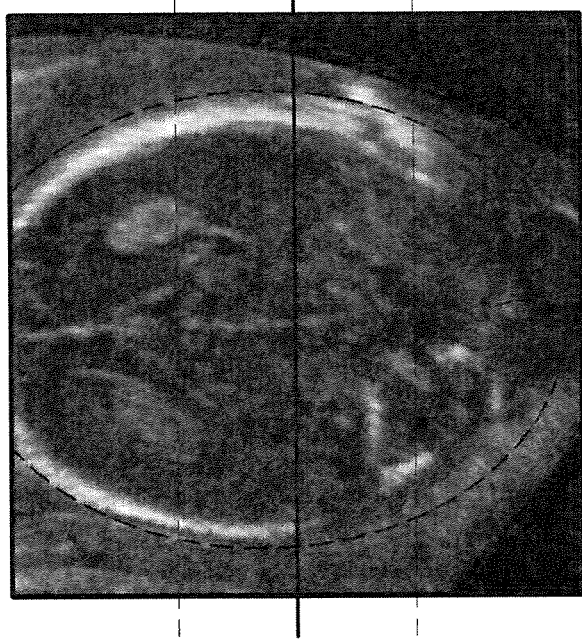

According another embodiment of the present disclosure, as illustrated in FIG. 8A, when a storage unit 140 stores a rendering area corresponding to a plurality of reference data (e.g., a first reference data and a second reference data) in a table type, an area setting unit 122 may determine the second reference data corresponding to the first reference data, which is inputted from a user through an input unit 400 or automatically determined, and may extract a rendering area corresponding to the second reference data from the storage unit 140. The area setting unit 122 may set the rendering area as a rendering area of a region of interest, as illustrated in FIG. 8B. For example, the first reference data may be a head circumstance (HC) of fetus, the second reference data may be gestational age (GA), and the rendering area may be corpus callosum length. In order to determine a head circumstance (HC) of fetus, the area setting unit 122 may extract a cross sectional image in which a head circumstance in a volume image may be capable of being measured, may determine gestational age (GA) corresponding to the head circumstance, and may extract a rendering area corresponding to the gestational age (GA).

Meanwhile, the first reference data is not limited to gestational age (GA). The first reference data may be a thickness of Cavum septum pellucidum (CSP) in a depth direction of a sagittal plane. When a region of interest is Nuchal Translucency (NT), the first reference data may be a thickness of head in a depth direction of a sagittal plane. That is, a first reference data may be various data to estimate a rendering area.

According to another embodiment of the present disclosure, as illustrated in FIGS. 9A and 9B, an area setting unit 122 may calculate a similarity between a cross sectional data of a region of interest included in a reference plane and a cross sectional data of a region of interest included in a plurality of cross sectional images in volume images, and may set a distance from the reference plane to the plurality of cross sectional images as a rendering area, wherein the plurality of cross sectional images may have a similarity larger than a reference value. For example, the area setting unit 122 may calculate a similarity between a cross sectional data of corpus callosum (CC) included in mid-sagittal plane that is a reference plane, and a cross sectional data of corpus callosum (CC) included in various cross sectional images except the mid-sagittal plane, as illustrated in FIG. 9A. Referring to FIGS. 9A and 9B, the area setting unit 122 may set a maximum distance (−1, +1) to a cross sectional image having 80% of similarity (a reference value) as a rendering area. The image processing unit 121 may generate a 3D data (e.g., a rendering image showing a thickness of corpus callosum (CC)) based on cross sectional data contained in a plurality of cross sectional images in which a distance from mid-sagittal plane is −1, 0 (a reference plane), +1. The cross sectional data may include a brightness of the region of interest, blood flow speed, shape and size.

According to another embodiment of the present, as illustrated in FIGS. 10A-10C, an area setting unit 122 may obtain Doppler information of a region of interest contained in a plurality of cross section images, and may set a distance from a reference plane to a plurality of cross sectional images as a rendering area, wherein the plurality of cross sectional images may have color information included in Doppler information or may indicate a blood flow speed, which is included in Doppler information, greater than a reference value. The Doppler information may be color information in blood flow of the region of interest and may be indicated in various colors according to blood flow speed. For example, when a portion in which blood flow speed is greater than a reference value is displayed in black, referring to FIGS. 10A and 10B, the area setting unit 122 may set a maximum distance among distances to a plurality of sequent cross sectional images including black portion as a rendering area. The plurality of sequent cross sectional images may represent a plurality of cross sectional images of an object, which are continuous in a direction perpendicular to the reference plane.

As mentioned above, the rendering area may represent a distance from a reference plane and may include both a vertical distance in a positive (+) direction from the reference plane and a vertical distance in a negative (−) direction from the reference plane.

When the area setting unit 122 automatically sets a distance from a reference plane that is a rendering area, the image processing unit 121 may generate a 3D data of a region of interest based on across sectional data contained in a plurality of cross sectional images existing in a rendering area. For example, when a rendering are is set to be 4.5 mm from a reference plane in a positive direction and 3.5 mm from a reference plane in a negative direction, the image processing unit 121 may estimate a thickness of corpus callosum based on a cross sectional data contained in a reference plane, a plurality of cross sectional images within a distance range from 0 to 4.5 mm, and a plurality of cross sectional images within a distance range from −3.5 mm to 0. The image processing unit 121 may generate a rendering image based on the estimated thickness of corpus callosum.

The image processing unit 121 may perform various post-processing, such as increasing contrast of a rendering image based on brightness value of a plurality of cross sectional images existing in a rendering area.

Referring to FIG. 3 again, the control unit 130 may control overall operation of the imaging apparatus 10. Particularly, the control unit 130 may generate control signals to control at least one of the beamforming unit 110, the image generating unit 120, the storage unit 140, the ultrasonic probe 200, or the display unit 300 to response instructions or commands of programs stored in the storage unit 140 or input through the input unit 400. Alternatively, the control unit 130 may generate control signals to control compartments to response commands received from outside devices through wired/wireless communication.

The control unit 130 may include a processor, a ROM in which control programs for control of the imaging apparatus 10 are stored, and a RAM in which signals or data input from the outside are stored or which is used as a storage area to correspond to various operations performed in the imaging apparatus 10.

The processor may be realized in a shape of System on Chip (SoC) including core and GPU. The processor may include a single core, a dual core, a triple core, a quad core and various multiple cores.

The control unit 130 may include a graphic processing board which is a circuit board electrically connected includes a processor, and RAM or ROM. The process, a ROM, and RAM may be connected to each other through an internal bus.

As mentioned above, the RAM and the ROM may be a component provided in the control unit 130, or may be a component provided in separated storage unit 140.

The storage unit 140 may be configured to store programs and data related to the imaging apparatus 10, and may include a program portion and a data portion. The program portion may store programs about functions of the imaging apparatus 10, and data generated according to an operation of the imaging apparatus 10, such as volume images, cross sectional images, a cross sectional data, a 3D data, an object, and a region of interest or predetermined data. Data stored in the storage unit 140 may be displayed for a user through the display unit 300.

The storage unit 140 may employ volatile memory, such as, cache memory, Read Only Memory (ROM), Programmable ROM (PROM), Erasable Programmable ROM (EPROM), Electrically Erasable Programmable ROM (EE-PROM) and Flash memory, nonvolatile memory, such as, Random Access Memory (RAM), Hard Disk Drive (HDD), or CD-ROM, but is not limited thereto. The storage unit 140 may be realized in various shapes which are well known to people in the art.

The display unit 300 may display volume images, cross sectional images, cross sectional data, and 3D data, all of which are generated by the image generating unit 120, to a user. For example, the display unit 300 may display a volume image of an object, as illustrated in FIG. 6A, cross-sectional images, as illustrated in FIGS. 6B and 6C, and a cross sectional data, as illustrated in FIG. 8B (e.g., head circumstance (HC) of fetus). In addition, the display unit 300 may display a marker indicating region of interest, and measurement or diagnostic information of the region of interest.

FIGS. 11A-11E are 3D data and cross-sectional data displayed by a display unit according an embodiment of the present disclosure.

The display unit 300 may display a rendering image that is a 3D data IU generated by the image generating unit 120. As mentioned above, the rendering image may represent 3D images generated by adding a reality to 2D images by using a shadow, a color, contrast, etc.

Referring to 11A, the display unit 300 may display a rendering image, generated by the image generating unit 120, in which an object has improved contrast.

Figure 11A:
FIGS. 11A-11E are 3D data and cross-sectional data displayed by a display unit according an embodiment of the present disclosure.
Figure 11B:

In order that a user may accurately recognize corpus callosum, the display unit 300 may display corpus callosum by using a marker, as illustrated in FIG. 11B. The marker may be displayed as a color or an arrow indicating a region of interest.

Figure 11C:

The display unit 300, as illustrated in FIG. 11C, may display a rendering image in which a predetermined area in a region of interest has improved contrast. That is, the display unit 300 may combine a rendering image and across sectional image, and may adjust a degree of coupling between the rendering image and the cross sectional image. For example, the display unit 300 may distinguish rendered region of interest from the others by adjusting blending value, such as brightness, definition, and a degree of coupling, in a predetermined area.

Figure 11D:
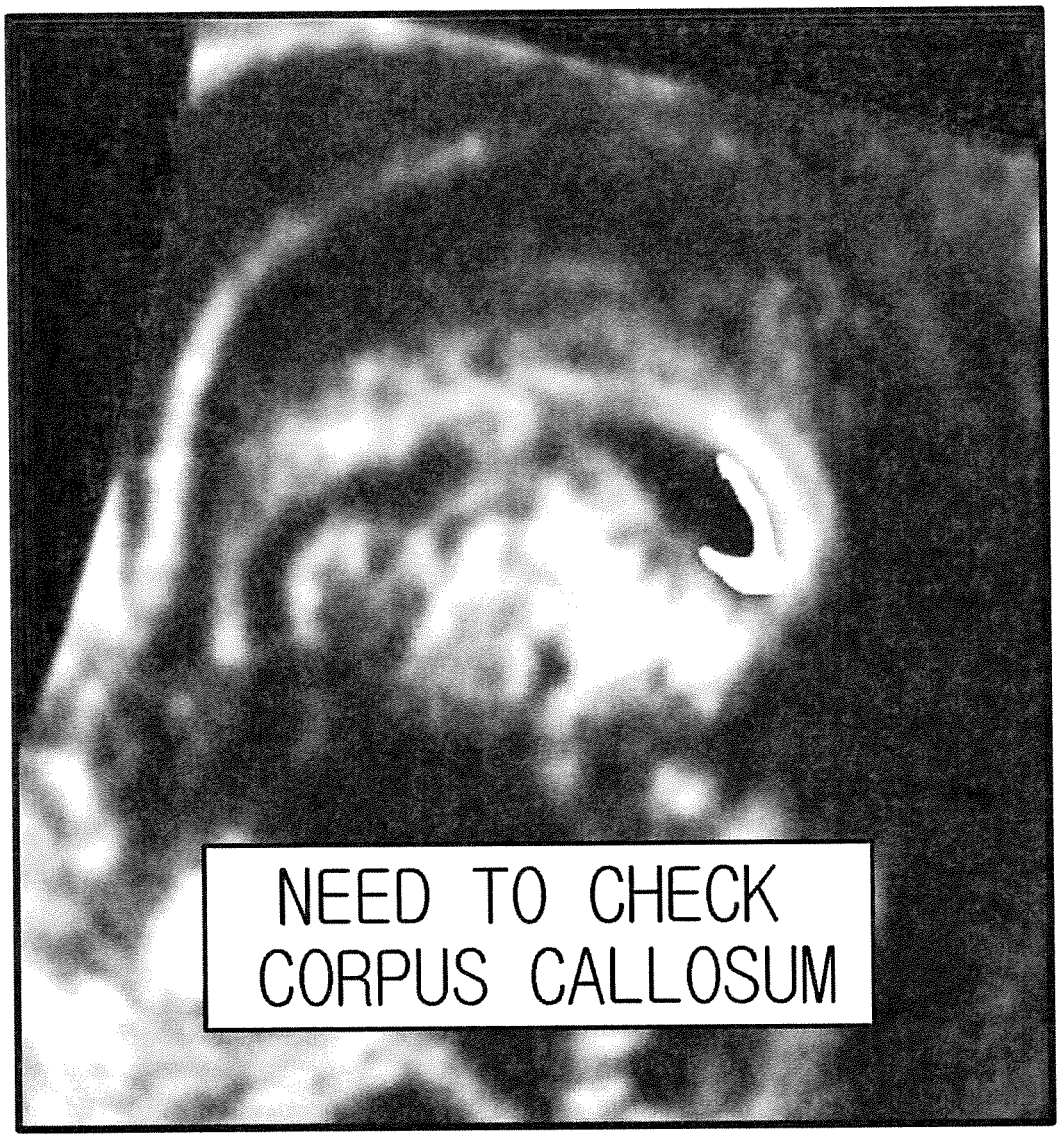
Figure 11E:
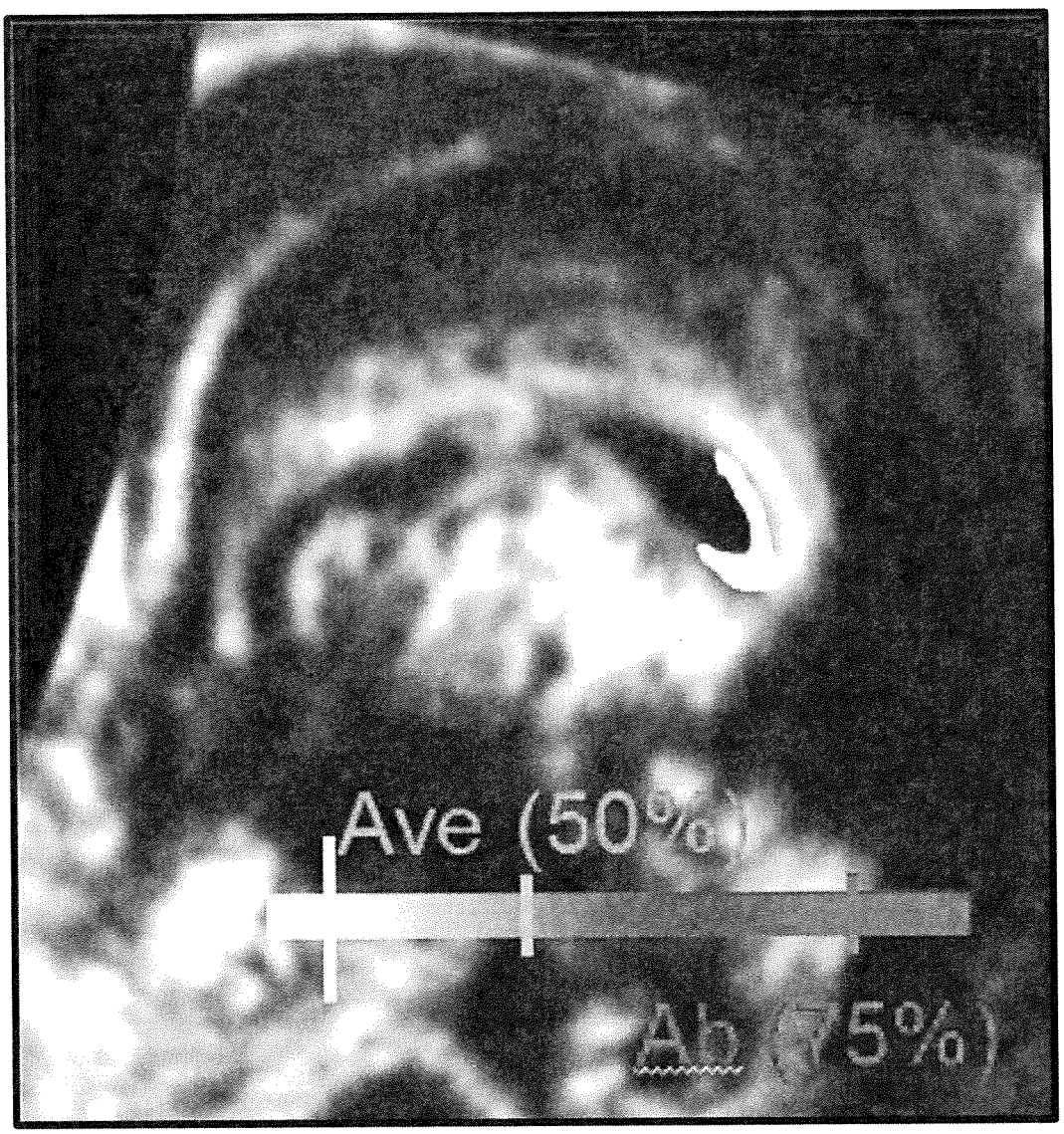

As illustrated in FIG. 11D, the display unit 300 may further display the presence of an abnormality as diagnostic information of region of interest. As illustrated in FIG. 11E, the display unit 300 may display a degree of abnormality in various colors, but is not limited thereto. The display unit 300 may display volume images, cross sectional images, a cross sectional data, and a 3D data in various ways.

The display unit 300 may employ plazma display panel (PDP), light emitting diode (LED) or, liquid crystal display (LCD). In addition, the display unit 300 may employ 3D display unit capable of displaying volume images. The display unit 300 may include a touch screen. When the display unit 300 includes a touch screen, the display 300 may perform a function of the input unit 400. The touch-screen may employ a resistive touchscreen panel or a capacitive touchscreen panel. Otherwise, the touch screen may use ultrasound or infrared light. The display unit 300 may display images according to a mode selected by a user. When a user does not select a mode, the display unit 300 may display images in a predetermined default mode (e.g., B-mode).

Figure 12:
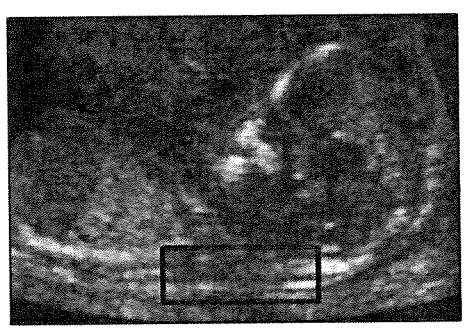
FIG. 12 is a 3D data of various regions of interest displayed by the display unit.
Figure 12:
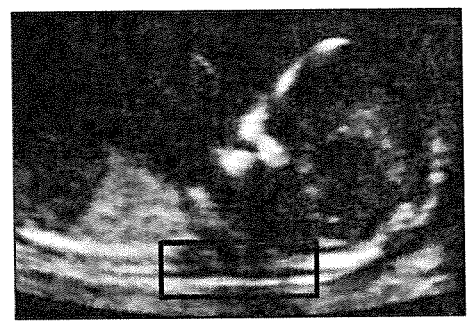
Figure 12:
Figure 12:
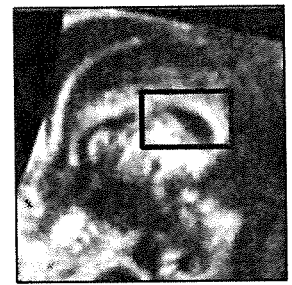
Figure 12:
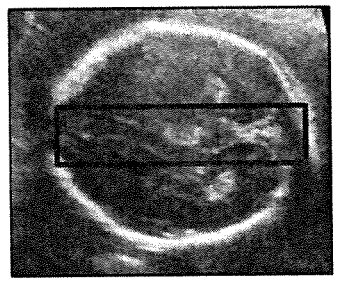
Figure 12:
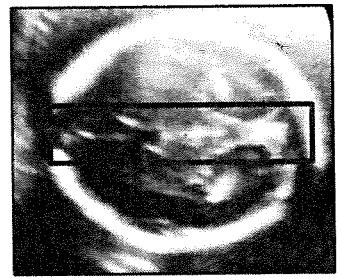

In the described embodiments, generating and displaying a 3D data of corpus callosum was described. As illustrated in FIG. 12, the image generating unit 120 may generate a 3D data of Nuchal Translucency (NT) and falx and the display unit 300 may display the 3D data, but is not limited thereto.

The left side images in FIG. 12 are general cross sectional images of Nuchal Translucency (NT), corpus callosum and falx, and the right side images in FIG. 12 are rendering images of Nuchal Translucency (NT), corpus callosum and falx.

Referring to FIG. 12, NT is an acronym of Nuchal Translucency and may be used to identify higher chances for chromosomal abnormalities at early stage of pregnancy. The Nuchal Translucency is measured at 10-13 weeks pregnancy. When a thickness of Nuchal Translucency is less than 3 mm at 11-14 weeks pregnancy, it is determined to be normal but when a thickness of Nuchal Translucency is more than 3 mm, it is determined that there is higher chances for chromosomal abnormalities (e.g., Down syndrome and Tuner syndrome).

Therefore, when Nuchal Translucency is set as a region of interest, the image generating unit 120 may set a rendering area in the Nuchal Translucency and proceed with the described-above process so that a transparent portion in the nuchal may be clearly examined.

As for falx, when a falx line including falx is set as a rendering area and the described-above process is proceed, falx may be clearly examined.

Referring to FIG. 3 again, the input unit 400 may allow a user to input control commands of the imaging apparatus 10, and may be provided with a plurality of screens so that a user may input control commands while watching the display unit 300 displaying various images of an object and a region of interest. A user may set an object and a region of interest through the input unit 400, may select a reference plane, and may choose a 3D data and a cross sectional data (e.g., diagnostic information) which will be displayed on the display unit 300.

The input unit 400 may include at least one of a keyboard, a mouse, a trackball, a touch screen, a foot switch, or a foot pedal, but is not limited thereto.

The input unit 400 may be provided on an upper portion of the host device 100 as shown in FIG. 2, or may be provided on a lower portion of the host device 100 when the input unit 400 is implemented with a foot switch or a foot pedal.

When the input unit 400 is implemented in a Graphical User Interface (GUI), i.e., in software like a touch screen, the input unit 400 may be displayed on the display unit 300, which will be described later.

At least one ultrasound probe holders may be provided on around the input unit 400 to hold the ultrasound probe 200. Therefore, a user may keep the ultrasound probe 200 in the ultrasound probe holder while the imaging apparatus 100 is not used.

According to embodiments of the present disclosure, some components provided in the imaging apparatus 100 may be implemented as modules. Here, the term "module" may represent a software element or a hardware element, such as a Field Programmable Gate Array (FPGA) or an Application Specific Integrated Circuit (ASIC), and the module may perform a predetermined role. However, the module is not limited to software or hardware. Further, the module may be constructed to exist in an addressable storage module, or to play one or more processors.

The module may include elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables. Herein, functions provided by components and modules may be provided by a smaller number of combined larger components and modules, or by a larger number of divided smaller components and modules. In addition, the components and modules may be realized to operate one or more CPUs in a device.

Hereinafter a control method of the imaging apparatus 10 will be described with reference to FIGS. 13 to 16, and FIGS. 13 to 16 are views a flow chart illustrating a control method of the imaging apparatus according to an embodiment of the present disclosure.

Figure 13:
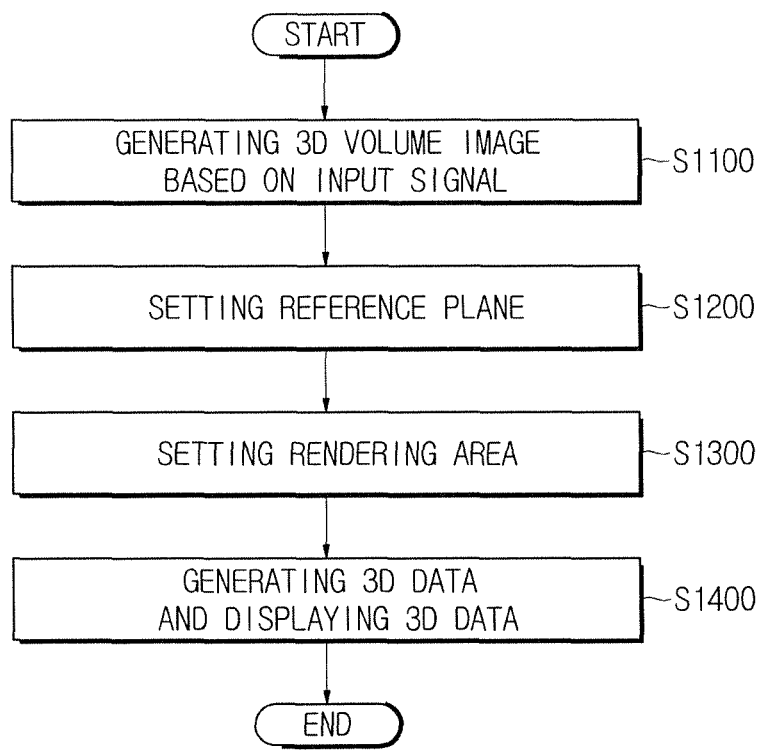
FIGS. 13 to 16 are views a flow chart illustrating a control method of the imaging apparatus according to an embodiment of the present disclosure.

Referring to FIG. 13, the imaging apparatus 10 may receive reflected ultrasonic waves from an object through the ultrasonic probe 200, may receive an input signal that is an electrical signal converted from an ultrasonic signal, and may generate an ultrasonic image based on the input signal S1100. The ultrasonic image may include volume images and cross sectional images of the object, and further include images in Amplitude mode (A-mode) images, Brightness mode (B-mode). Doppler mode (D-mode). Elastography mode (E-mode), and Motion mode (M-mode).

Volume images are an image representing an object in 3D image. When the imaging apparatus 10 records the object by using X-rays, volume images may represent an image generated by obtaining volume data of a region of interest by rotating the X-rays in a spiral around the object. When the imaging apparatus 10 records the object by ultrasonic waves, volume images may represent an image generated by obtaining volume data of a region of interest through a 3D ultrasonic probe, a matrix ultrasonic probe, a mechanical ultrasonic probe or the like.

The imaging apparatus 10 may set a reference plane of a volume image S 1200.

According to an embodiment, when a reference plane is automatically set, the image processing unit 121 may extract a reference plane by using anatomical information including a feature point and a feature line of an object. The anatomical information may include mid-line of brain information, such as 3rd ventricle line, and Falx line. In addition, the imaging apparatus 10 may automatically extract a mid-sagittal plane by using a machine learning method based on data stored in the storage unit 140.

According to another embodiment, when a reference plane is manually set, the imaging apparatus 10 may detect falx from a volume data by using a feature point or a feature line inputted from a user, and may extract a reference plane by using detected falx.

The imaging apparatus 10 may automatically set a rendering area by using a distance from the reference plane S 1300. A method of automatically setting rendering area S1300 will be described later with reference to FIGS. 14 to 16.

The imaging apparatus 10 may generate a 3D data based on a plurality of cross sectional images existing in a set rendering area, and may display the 3D data S 1400. In addition, the imaging apparatus 10 may display volume images, cross sectional images, and across sectional data as well as the 3D data. The 3D data may include various information of an object or a region of interest, such as rendering images, a thickness, and a depth of the object or the region of interest. In addition, the imaging apparatus 10 may display a region of interest by using a marker, and may generate and display a rendering image of only a predetermined area in the region of interest. The marker may be displayed by using a color indicating a region of interest and an arrow. In addition, the imaging apparatus 10 may display a cross sectional data and a 3D data of a region of interest, such as diagnostic information (e.g., the presence of abnormality and a degree of abnormality of a region of interest)

Hereinafter a method of setting a distance from a reference plane by the imaging apparatus 10 will be described with reference to FIGS. 14 to 16.

Figure 14:
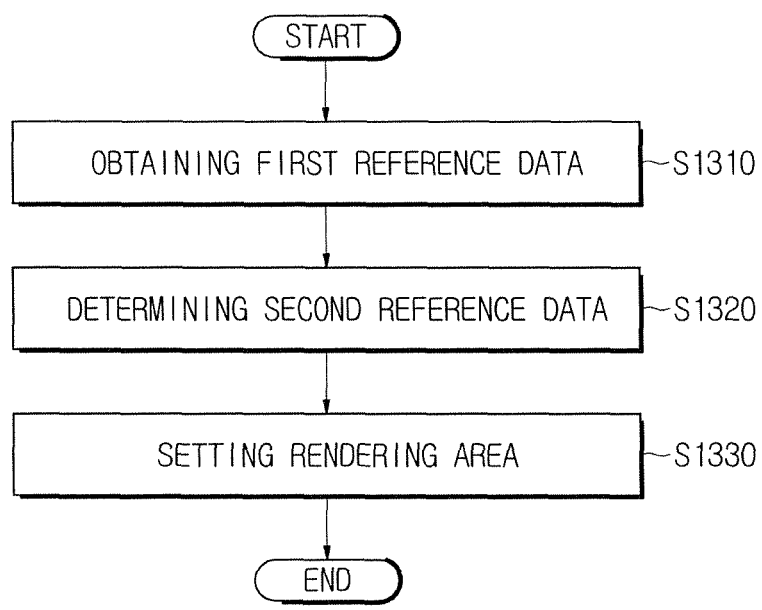

Referring to FIG. 14, the imaging apparatus 10, according an embodiment, may set a distance (hereinafter referred to as a rendering area) by using a reference data stored in the storage unit 140. Particularly, when the storage unit 140 stores a rendering area corresponding to a first reference data in a table type, the imaging apparatus 10 may extract a rendering area corresponding to the first reference data from the storage unit 140, wherein the first reference data may be automatically determined (S 1310) or inputted from a user. The imaging apparatus 10 may set an extracted rendering area as a rendering area of a region of interest S 1330. For example, the first reference data may be gestational age (GA), the rendering area may be corpus callosum length. The gestational age may be a parameter representing that how many weeks is fetus.

When the storage unit 140 stores a rendering area corresponding to a plurality of reference data (e.g., a first reference data and a second reference data) in a table type, the imaging apparatus 10 may determine the second reference data S 1320 corresponding to the first reference data, which is inputted from a user through the input unit 400 or automatically determined S 1310, and may extract a rendering area corresponding to the second reference data from the storage unit 140. The imaging apparatus 10 may set the rendering area as a rendering area of a region of interest S 1330. For example, the first reference data may be a head circumstance (HC) of fetus and the second reference data may be gestational age (GA), the rendering area may be corpus callosum length. In order to determine a head circumstance (HC) of fetus, the imaging apparatus 10 may extract a cross sectional image in which a head circumstance in a volume image may be capable of being measured, may determine gestational age (GA) corresponding to the head circumstance, and may extract a rendering area corresponding to the gestational age (GA).

Figure 15:
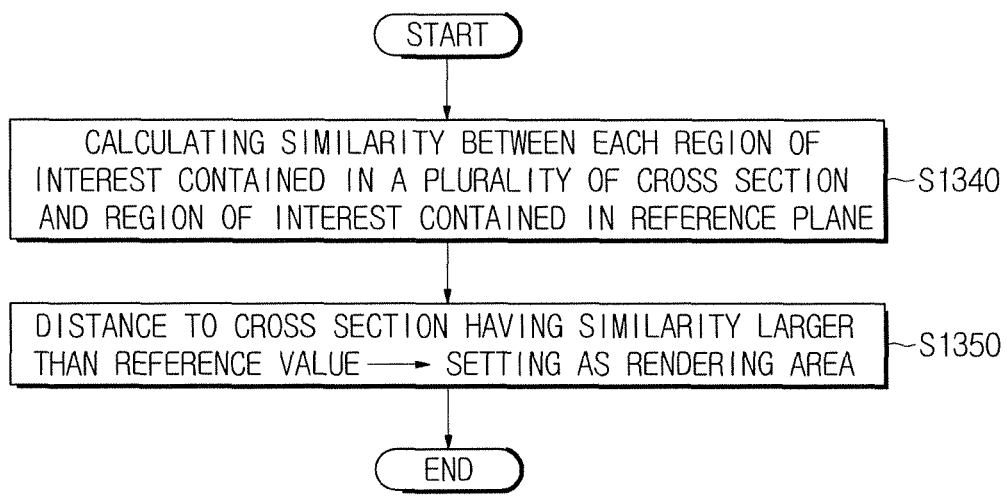

Referring to FIG. 15, the imaging apparatus 10 according to another embodiment, may calculate a similarity between a cross sectional data of a region of interest included in a reference plane and a cross sectional data of a region of interest included in a plurality of cross sectional images in volume images S 1340 and may set a distance from the reference plane to the plurality of cross sectional images as a rendering area, wherein the plurality of cross sectional images may have a similarity greater than a reference value S 1350. For example, the imaging apparatus 10 may calculate a similarity between a cross sectional data of corpus callosum (CC) included in mid-sagittal plane that is a reference plane, and a cross sectional data of corpus callosum (CC) included in various cross sectional images except the mid-sagittal plane. The imaging apparatus 10 may generate a 3D data based on a cross sectional data including cross sectional images existing in the maximum distance from mid-sagittal plane. The cross sectional data may include a brightness, blood flow speed, shape and size of region of interest.

Figure 16:
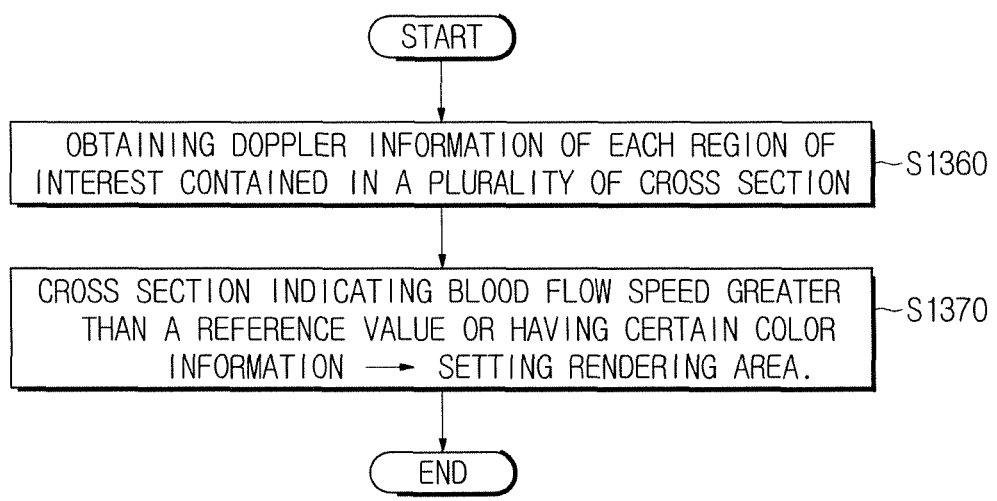

Referring to FIG. 16, the imaging apparatus 10 according to another embodiment, may obtain Doppler information of a region of interest included in a plurality of cross section images S 1360, and may set a distance from a reference plane to a plurality of cross sectional images as a rendering area, wherein the plurality of cross sectional images may have color information included in Doppler information or may have blood flow speed, which is included in Doppler information, greater than a reference value S 1370.

Doppler information may be color information in blood flow of a region of interest and may be indicated in various colors according to blood flow speed. For example, when a portion in which blood flow speed is greater than a reference value is displayed in black, the imaging apparatus 10 may set a maximum distance among distances to a plurality of sequent cross sectional images including black portion as a rendering area. The plurality of sequent cross sectional images may represent a plurality of cross sectional images of an object, which are continuous in a direction perpendicular to a reference plane.

As mentioned above, the rendering area may represent a distance from a reference plane and may include both a vertical distance in a positive (+) direction from the reference plane and a vertical distance in a negative (−) direction from the reference plane.

The imaging apparatus 10 and the control method thereof may be implemented as a computer code on a computer readable recording medium. The computer readable recording medium may include various kinds of recording medium stored data decrypted by the computer system. For example, there may be a Read Only Memory (ROM), a Random Access Memory (RAM), a magnetic tape, a magnetic disk, a flash memory, and an optical data storage device. In addition, the medium may be distributed to computer systems over a network, in which computer-readable code may be stored and executed in a distributed manner.

As is apparent from the above description, according to the proposed imaging apparatus, a distance from a reference plane of a region of interest or a rendering area may be automatically set to generate 3D data so that a user may easily obtain 3D data.

By automatically setting a distance from a reference plane of region of interest or a rendering area and by generating 3D data based on cross sectional data in the distance or the rendering area, accurate 3D data and 3D images may be easily obtained.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. An imaging apparatus comprising:
 a processor configured to generate volume images of an object including a region of interest and extract a reference plane of the volume images, and configured to automatically set a distance from the reference plane to a plane which is preset or input by a user;
 a memory configured to store distances corresponding to one or more reference data; and
 an input configured to receive a reference data from the user,
 wherein the processor sets a distance corresponding to the reference data inputted through the input as the distance from the reference plane, and
 the processor generates a 3D data of the region of interest based on a cross sectional data of the reference plane and the volume image data existing in the distance.
2. The imaging apparatus of claim 1, wherein
 the reference plane comprises at least one of a median plane, a mid-sagittal plane, a coronal plane or a horizontal plane.

3. The imaging apparatus of claim 1, wherein
the distance comprises a thickness of the region of interest.

4. The imaging apparatus of claim 1 wherein
the processor calculates a similarity between a cross sectional data of a region of interest contained in the reference plane and a cross sectional data of a region of interest contained in the plurality of cross sectional images, and sets a distance from the reference plane to a plurality of cross sectional images having a similarity greater than a reference value as a distance from the reference plane.

5. The imaging apparatus of claim 1 wherein
the processor obtains Doppler information of a region of interest contained in the plurality of cross sectional images, and sets a distance from the reference plane to a plurality of cross sectional images indicating blood flow speed ,which is contained in Doppler information, greater than a reference value as a distance from the reference plane.

6. The imaging apparatus of claim 1 wherein
the processor obtains Doppler information of a region of interest contained in the plurality of cross sectional images, and sets a distance from the reference plane to a plurality of cross sectional images having color information of a region of interest, which is contained in Doppler information of the reference plane, as a distance from the reference plane.

7. The imaging apparatus of claim 1 wherein
the processor extracts a cross sectional image including the region of interest as a reference plane.

8. The imaging apparatus of claim 1 wherein
the 3D data comprises a rendering image.

9. The imaging apparatus of claim 1 further comprising:
a display configured to display the 3D data.

10. The imaging apparatus of claim 9 wherein
the display further configured to display a marker indicating the region of interest and at least one of diagnostic information of the region of interest.

11. The imaging apparatus of claim 10 wherein
the marker comprises at least one of a color or an arrow indicating the region of interest.

12. The imaging apparatus of claim 10 wherein
the diagnostic information comprises at least one of a standard view of the region of interest, biparietal diameter (BPD), occipitofrontal diameter (OFD), head circumference (HC), Posterior Cerebral Ventricle Diameter (Vp), abdominal circumference (AC), femur length (FL), a location of thalamus (T), Doppler information of vessel, Transverse cerebellar Diameter (TCD), or Cisterna Magna (CM).

13. The imaging apparatus of claim 10 wherein
the display displays a 3D data of a predetermined area in the region of interest.

14. The imaging apparatus of claim 9 wherein
the display displays a rendering image having improved contrast based on the 3D data.

15. The imaging apparatus of claim 1 wherein
the imaging apparatus comprises an ultrasonic imaging apparatus.

16. The imaging apparatus of claim 1 wherein
the processor extracts a reference plane of volume images based on at least one of a feature point and a feature surface of the region of interest.

17. The imaging apparatus of claim 1 further comprising:
an input configured to receive information about at least one of the object or the region of interest.

18. The imaging apparatus of claim 1 wherein
the distance comprises a vertical distance from the reference plane.

19. An imaging apparatus comprising:
a processor configured to generate volume images of an object including a region of interest and extract a reference plane of the volume images, and configured to automatically set a distance from the reference plane to a plane which is preset or input by a user; and
a memory configured to store distances corresponding to a first reference data and a second reference data,
wherein the processor determines a second reference data corresponding to a first reference data contained in the plurality of cross sectional images, and sets a distance corresponding to the second data as a distance from the reference plane, and generates a 3D data of the region of interest based on a cross sectional data of the reference plane and the volume image data existing in the distance.

20. An imaging apparatus comprising:
a processor configured to generate volume images of an object including a region of interest and extract a reference plane of the volume images, and configured to automatically set a distance from the reference plane to a plane which is preset or input by a user,
wherein the processor generates a 3D data of the region of interest based on a cross sectional data of the reference plane and the volume image data existing in the distance, and
the region of interest comprises at least one of corpus callosum (CC), Nuchal Translucency (NT), or Falx.

21. A control method of an imaging apparatus comprising:
generating a volume image of a region of interest;
extracting a reference plane of the volume image;
setting automatically a distance from the reference plane to a plane which is preset or input by a user; and
generating a 3D data of the region of interest based on a cross sectional data of the reference plane and a cross sectional data contained in a plurality of cross sectional images of the volume image existing in the distance,
wherein the imaging apparatus comprises a memory configured to store distances corresponding to one or more reference data, and the setting the distance from the reference plane comprises:
receiving a reference data from the user; and
setting a distance corresponding to the reference data inputted through the input as the distance from the reference plane.

* * * * *